(12) United States Patent
Yu et al.

(10) Patent No.: US 12,436,440 B2
(45) Date of Patent: Oct. 7, 2025

(54) PHASE SHIFT KEYING MODULATOR

(71) Applicant: ROCKLEY PHOTONICS LIMITED, Altrincham (GB)

(72) Inventors: Guomin Yu, Glendora, CA (US); Aaron John Zilkie, Pasadena, CA (US); Frank Peters, Cork (IE)

(73) Assignee: Rockley Photonics Limited, Altrincham (GB)

( * ) Notice: Subject to any disclaimer, the term of this patent is extended or adjusted under 35 U.S.C. 154(b) by 686 days.

(21) Appl. No.: 17/734,962

(22) Filed: May 2, 2022

(65) Prior Publication Data

US 2022/0326588 A1 Oct. 13, 2022

Related U.S. Application Data

(63) Continuation-in-part of application No. 17/711,965, filed on Apr. 1, 2022, now abandoned.

(60) Provisional application No. 63/170,990, filed on Apr. 5, 2021.

(51) Int. Cl.
*G02F 1/225* (2006.01)
*G02F 1/21* (2006.01)

(52) U.S. Cl.
CPC ............ *G02F 1/2257* (2013.01); *G02F 1/212* (2021.01)

(58) Field of Classification Search
CPC ..... G02F 1/212; G02F 1/2257; G02B 6/2935; G02B 6/29352; G02B 6/29353; G02B 6/29355

See application file for complete search history.

(56) References Cited

U.S. PATENT DOCUMENTS

2016/0274319 A1* 9/2016 Krasulick .......... G02B 6/12004

* cited by examiner

*Primary Examiner* — Chad H Smith
(74) *Attorney, Agent, or Firm* — Womble Bond Dickinson (US) LLP

(57) ABSTRACT

A phase shift keying modulator. The modulator comprises: a plurality of silicon waveguides provided in a device layer of a silicon-on-insulator platform, the silicon-on-insulator platform including one or more cavities; one or more III-V semiconductor based devices located within the one or more cavities of the silicon-on-insulator platform, each III-V semiconductor-based device including a III-V semiconductor based waveguide which is coupled at an input end to one of the plurality of silicon waveguides and coupled at an output end to another of the plurality of silicon waveguides, each III-V semiconductor based waveguide comprising an active phase modulating portion; and one or more contacts in electrical contact with each active phase modulating portion, such that the phase shift keying modulator is operable to modulate the phase of an optical wave passing through each active phase modulating portion.

17 Claims, 26 Drawing Sheets

CPW electrode

CPS electrode

CPW electrode with T segments (capacitively loaded)

CPS electrode with T segments (capacitively loaded)

PHASE SHIFT KEYING MODULATOR

CROSS-REFERENCE TO RELATED APPLICATION(S)

The present application is a continuation-in-part of U.S. patent application Ser. No. 17/711,965, filed Apr. 1, 2022, entitled "PHASE SHIFT KEYING MODULATOR", which claims priority to and the benefit of U.S. Provisional Application No. 63/170,990, filed Apr. 5, 2021, entitled "III-V/SOI HYBRID DP-QPSK MODULATORS FABRICATED BY MTP TECHNOLOGY"; the entire contents of all of the documents identified in this paragraph are incorporated herein by reference.

FIELD OF THE INVENTION

The present invention relates a phase shift keying modulator and a method of making the same.

BACKGROUND

Phase shift keying modulators encode data by modulating the phase of a carrier signal. Phase shift keying modulators typically use Mach-Zehnder interferometer phase modulator (MZM) components, which comprise electro-optic active portions for modulating the phase of optical carrier waves and passive network routing portions.

MZM components in a silicon-on-insulator platform are typically made from silicon only material. Since silicon has low optical loss but low electro-optic modulation efficiency, a silicon only MZM component typically includes a long active portion, which results in large device size and low density of photonics integration.

It would be beneficial to achieve a phase shift keying modulator which is more compact. It would further be beneficial to achieve a phase shift keying modulator which has low optical loss but does not suffer from low electro-optic modulation efficiency.

SUMMARY

Accordingly, embodiments of a first aspect of the invention provide a phase shift keying modulator, comprising:
- a plurality of silicon waveguides provided in a device layer of a silicon-on-insulator platform, the silicon-on-insulator platform including one or more cavities;
- one or more III-V semiconductor based devices located within the one or more cavities of the silicon-on-insulator platform,
- each III-V semiconductor-based device including a III-V semiconductor-based waveguide which is coupled at an input end to one of the plurality of silicon waveguides and coupled at an output end to another of the plurality of silicon waveguides, each III-V semiconductor-based waveguide comprising an active phase modulating portion; and,
- one or more contacts in electrical contact with each active phase modulating portion, such that the phase shift keying modulator is operable to modulate the phase of an optical wave passing through each active phase modulating portion.

III-V semiconductors have higher electro-optic modulation efficiency than silicon and therefore allow the phase shift keying modulator to be more compact and power efficient. III-V semiconductors suffer from higher optical losses due to higher material loss. For this reason, silicon is used for passive waveguides of the phase shift keying modulator.

The use of III-V semiconductor and silicon materials together results in a hybrid phase shift keying modulator, such that a III-V phase modulating portion provides an electro-optic modulation active function and a silicon-on-insulator silicon waveguide provides a passive waveguide function. Such a hybrid phase shift keying modulator benefits from the advantageous properties of III-V semiconductors and silicon, and reduces the effects caused by the detrimental properties of these materials. That is, the phase shift keying modulator can have both low optical loss and high modulation efficiency. The hybrid phase modulator may combine the best of two materials (silicon and III-V semiconductor) to make high density of photonics integration.

Optional features of the phase shift keying modulator will now be described. The phase shift keying modulator may have any one, or any combination insofar as they are compatible, of the following features.

The silicon waveguides may perform only passive functions. By passive, it may be meant that the waveguides do not function to modify any properties of optical signals being passed therethrough (asides to the extent that passive waveguides do, for example due to transmission losses). For example, they may not be provided with electrodes or other terminals such that electrical signals cannot be imparted to them.

The active phase modulating portions may be short, e.g. relative to the silicon waveguides. That is, the active phase modulating portions may have a length (e.g. an optical path length) which is shorter than a corresponding length in the silicon waveguides. For example, an active phase modulating portion may have a length of at least 300 microns and no more than 3000 microns.

The active phase modulating portion may be formed of a p-doped region facing an n-doped region across an intrinsic (undoped) region, thereby forming a p-i-n junction. The application of a voltage to the p-doped and n-doped regions causes an electric field to be generated across the p-i-n junction. The p-doped layer may be formed from InGaAs, InGaAsP, and InP, or with AlInGaAs. The intrinsic layer may be formed from AlInGaAs, or InGaAsP The n-doped layer may be formed from InP, or with AlInGaAs, or with InGaAsP. The active phase modulating portion of the III-V semiconductor-based device may use the quantum confined stark effect, or Franz-Keldysh effect or the free carrier plasma dispersion effect to modulate light passing therethrough.

A bias point of the or each active phase modulating portion may be needed to achieve required modulation speed, Vpi and operating wavelength, etc. The or each III-V semiconductor based device may include a heater, for example in the passive silicon waveguide portion, which can be used to tune an MZM operating point, such as Null point or Quad point, etc.

A III-V semiconductor-based device of the phase shift keying modulator may be a III-V semiconductor-based waveguide which comprises only one optical path. The III-V semiconductor-based waveguide is coupled an input end to one of the plurality of silicon waveguides and is coupled at an output end to another of the plurality of silicon waveguides. The III-V semiconductor-based waveguide comprises an active phase modulating portion. By including relatively few components in the III-V semiconductor based devices they are simpler to manufacture. These III-V semiconductor-based devices also lead to low optical loss when used in a phase shift keying modulator.

A III-V semiconductor-based device of the phase shift keying modulator may be a III-V semiconductor-based MZM, the III-V semiconductor-based MZM comprising a primary III-V semiconductor-based waveguide which is coupled at an input end to one of the plurality of silicon waveguides and which is coupled at an output end to another of the plurality of silicon waveguides. The primary III-V semiconductor-based waveguide may comprise a beam splitter which splits the input side of the primary III-V semiconductor-based waveguide into two secondary III-V semiconductor-based waveguides. Each of the two secondary III-V semiconductor-based waveguides may comprise an active phase modulating portion. The primary III-V semiconductor-based waveguide may further comprise a beam combiner which combines the two secondary III-V semiconductor-based waveguides at the output side of the primary III-V semiconductor-based waveguide. Phase shift keying modulators comprising these III-V semiconductor-based devices may be more compact than phase shift keying modulators comprising III-V semiconductor-based devices which are a III-V semiconductor-based waveguide comprising only one optical path.

The one or more III-V semiconductor-based devices may be provided on one or more device coupons. Each device coupon may be bonded to a bed of a respective cavity of the silicon-on-insulator platform. Providing the III-V semiconductor-based devices on device coupons which are initially separate from the silicon-on-insulator platform simplifies the manufacturing process required to form the platform waveguides and the coupon waveguides from different materials in monolithic integration. Moreover, by providing the III-V semiconductor-based devices on device coupons which are initially separate from the silicon-on-insulator platform, the III-V device and/or silicon waveguides in the silicon-on-insulator platform can be tested before integration. This provides a higher yield as components are not wasted (e.g. by bonding a faulty III-V device to a functional silicon waveguide).

The device coupons may be bonded to the silicon-on-insulator platform by flip-chip bonding. The device coupons may be bonded to the silicon-on-insulator platform by transfer printing. The device coupons may be bonded to the silicon-on-insulator platform by micro-transfer printing. This can be ascertained through investigation under, e.g., a scanning or tunnelling electron microscope. In micro-transfer printing methods, a III-V semiconductor-based device can be printed into a cavity of the silicon-on-insulator platform in the same orientation it was manufactured, and the alignment between the waveguide of the III-V semiconductor-based device and the silicon waveguide is predetermined in the vertical direction. The requirements for alignment between the III-V semiconductor-based waveguide and the silicon waveguides are therefore reduced from three dimensions to two, which can be more easily facilitated.

The interface between a silicon waveguide and the III-V semiconductor-based waveguide of a III-V semiconductor-based device on a device coupon may be referred to herein as a facet. An input facet may refer to the coupling of the III-V semiconductor-based waveguide at an input end to one of the plurality of silicon waveguides, and an output facet may refer to the coupling of the III-V semiconductor-based waveguide at an output end to another of the plurality of silicon waveguides.

A device coupon of the phase shift keying modulator may comprise only one III-V semiconductor-based device, the III-V semiconductor-based device being a III-V semiconductor-based waveguide which comprises only one optical path. These device coupons may have one input facet and one output facet.

Phase shift keying modulators which include these device coupons by transfer printing are simpler to manufacture than phase shift keying modulators which include device by monolithic integration with epi growth in SOI cavities. These device coupons may provide lower optical losses when used in phase shift keying modulators than device coupons which include more complicated III-V semiconductor-based devices. The III-V semiconductor-based waveguide may be U-shaped, such that the input facet and output facet are both on the same side of the device coupon. The III-V semiconductor-based waveguide may comprise a U-shaped portion. This allows the device coupon facet and SOI facet alignment process more efficient since only one alignment is needed for the two facets.

Each device coupon which comprises only one III-V semiconductor-based waveguide which comprises only one optical path may have a width of around 60 microns and a length of at least 400 microns and no more than 4000 microns. The length of the active phase modulating portion of the III-V semiconductor-based waveguide may be at least 300 and no more than 3000 microns.

A device coupon of the phase shift keying modulator may comprise two III-V semiconductor-based devices, each of the two III-V semiconductor-based devices being a III-V semiconductor-based waveguide which comprises only one optical path. These device coupons may have two input facets and two output facets. The two III-V semiconductor-based waveguides may have equal optical path lengths.

Phase shift keying modulators which include these device coupons may be more compact than phase shift keying modulators which include device coupons which comprise only one III-V semiconductor-based waveguide comprising only one optical path. These device coupons may provide lower optical losses when used in phase shift keying modulators than device coupons which include more complicated III-V semiconductor-based devices. The two III-V semiconductor-based waveguides may be U-shaped such that the input facets and the output facets are on the same side of the device coupon. The two III-V semiconductor-based waveguides may comprise U-shaped portions. This allows each device coupon, and therefore the overall phase shift keying modulator, to be more flexible for device layout arrangements.

Each device coupon which comprises two III-V semiconductor-based waveguides may have a width of at least 60 microns and no more than 80 microns and a length of at least 400 and no more than 4000 microns. The length of the active phase modulating portion of each of the two III-V semiconductor-based waveguides may be at least 300 and no more than 3000 microns.

A device coupon of the phase shift keying modulator may each comprise only one III-V semiconductor-based device, the only one III-V semiconductor-based device being a III-V semiconductor-based MZM.

Phase shift keying modulators which include these device coupons may be more compact than phase shift keying modulators which include device coupons which comprise III-V semiconductor-based devices which are III-V semiconductor-based waveguides each comprising a single optical path.

The beam splitter of the MZM may be a 1×2 multimode interferometer, a 1×2 Y split, or a 2×2 directional coupler. The beam combiner of the MZM may be a 2×1 multimode interferometer, a 2×2 multimode interferometer or a 2×2 directional coupler. The device coupon may have one input facet and one output facet. The device coupon may have one input facet and two output facets.

Each device coupon which comprises only one MZM may have a width of at least 80 microns and no more than 100 microns and a length of at least 500 microns and no more than 4500 microns. The length of the active phase modulating portions of each of the two III-V semiconductor-based waveguides of the MZM may be at least 300 microns and no more than 3000 microns.

A device coupon of the phase shift keying modulator may each comprise two III-V semiconductor-based devices, each of the two III-V semiconductor-based devices being a III-V semiconductor-based MZM. The two III-V semiconductor-based MZMs may be arranged in parallel to one another. The two III-V semiconductor-based MZMs may be arranged such that they are substantially parallel to one another. By parallel, it may be meant that the two III-V semiconductor-based MZMs generally extend in a same direction. Phase shift keying modulators which include these device coupons may be more compact.

The beam splitter of each of the two MZMs may be a 1×2 multimode interferometer, a 1×2 Y split, or a 2×2 directional coupler. The beam combiner of each of the two MZMs may be a 2×1 multimode interferometer, a 2×2 multimode interferometer or a 2×2 directional coupler. The device coupon may have two input facets and two output facets. The device coupon may have two input facets and three output facets. The device coupon may have two input facets and four output facets.

Each device coupon which comprises two MZMs may have a width of at least 100 microns and no more than 200 microns and a length of at least 500 microns and no more than 4500 microns. The length of the active phase modulating portions of each of the two III-V semiconductor-based waveguides of each of the two MZMs may be at least 300 microns and no more than 3000 microns.

The phase shift keying modulator may include a binary phase shift keying modulator component. The binary phase shift keying modulator component has a Mach Zehnder interferometer (MZI) phase modulator structure. This structure reduces the frequency chirp of the modulation. The two arms of the MZI phase modulator structure may be of equal length. The two arms of the MZI phase modulator structure may be of equal optical path length.

Accordingly, the phase shift keying modulator may include a binary phase shift keying modulator component, the binary phase shift keying modulator component comprising:
 a beam splitter, the beam splitter splitting an input optical path into two modulation optical paths; and,
 a beam combiner, the beam combiner combining the two modulation optical paths into an output optical path,
wherein the input optical path passes through an input silicon waveguide, each of the two modulation optical paths pass through respective active phase modulating portions, and the output optical path passes through an output silicon waveguide.

The binary phase shift keying modulator component is operable to modulate the phases of optical waves passing through the binary phase shift keying modulator component according to a binary phase shift keying modulation scheme.

The optical path lengths of the modulation optical paths may be equal.

The beam splitter be a 1×2 multimode interferometer, a 1×2 Y splitter, or a 2×2 directional coupler. The beam combiner may be a 2×1 multimode interferometer, a 2×2 multimode interferometer or a 2×2 directional coupler.

The beam combiner may be a 2×2 beam combiner. One of the two output waveguides of a 2×2 beam combiner may be connected to a monitor for monitoring a DC bias of the binary phase shift keying modulator component. The monitor may be a photodetector. The passive waveguide connecting the beam combiner to the monitor may be made of silicon. The monitor may be integrated on the silicon-on-insulator platform or may be an external component. The null point bias of the binary phase shift keying component may be controlled. For example, this can be performed with a low frequency (e.g. 1-10 kHz) dither signal which is added to a DC bias. The monitor photodetector can then generate a corresponding signal which feeds into one or more close loop control circuit(s) which control the bias point. When the bis point is away from the setting point, the signal from the photodetector changes, and the control circuit(s) can tell the bias point has changed from the signal form. They can then change the bias to bring it back.

III-V semiconductor-based devices used in the binary phase shift keying modulator component may be III-V semiconductor-based waveguides which each comprise only one optical path. In this case, the beam splitter and the beam combiner of the binary phase shift keying modulator component may be provided on the silicon-on-insulator wafer. The beam splitter and the beam combiner may be made of silicon. This is advantageous because silicon-based beam splitters and beam combiners, as well as the routing silicon waveguides, incur lower optical losses.

When these III-V semiconductor-based devices are used, an optical path may pass through the binary phase shift keying modulator component as follows. An input optical path passes through a primary input silicon waveguide. The input optical path is then split into two modulation optical paths at the beam splitter. The two modulation optical paths pass through respective secondary input silicon waveguides. The secondary input silicon waveguides are each coupled to respective III-V semiconductor-based waveguides at the input ends of the III-V semiconductor-based waveguides. Each modulation optical path passes through its respective III-V semiconductor-based waveguide, and the active phase modulating portion of the III-V semiconductor-based waveguide. Each III-V semiconductor-based waveguide is coupled at its output end to a respective secondary output silicon waveguide. Each modulation optical path passes through its respective secondary output silicon waveguide. A beam combiner combines the two modulation optical paths. The output optical path passes through a primary output silicon waveguide.

The binary phase shift keying modulator component comprising these III-V semiconductor-based devices may be realised by using device coupons which each comprise only one of these III-V semiconductor-based devices. In this case two device coupons may be provided. The binary phase shift keying modulator component comprising these III-V semiconductor-based devices may be realised by using a device coupon which comprises two of these III-V semiconductor-based devices. In this case one device coupon may be provided.

A III-V semiconductor-based device used in the binary phase shift keying modulator component may be III-V semiconductor-based MZM. In this case, the beam splitter and the beam combiner of the binary phase shift keying modulator component may be included in the III-V semiconductor-based device. This arrangement is advantageous because the binary phase shift keying modulator component may be more compact. The binary phase shift keying modulator may also be simpler to construct with better optical loss uniformity between the two arms of MZI to achieve better extinction ratio due to the lack of III-V/SOI waveguide coupling loss variations, as one III-V semiconductor-based waveguide of the binary phase shift modulator component may be aligned with silicon waveguides for the phase shift modulation.

When these III-V semiconductor-based devices are used, an optical path may pass through the binary phase shift keying modulator component as follows. An input optical path passes through an input silicon waveguide. The input silicon waveguide is coupled to a primary III-V semiconductor-based waveguide at the input end of the primary III-V semiconductor-based waveguide. The optical path passes into the input side of the primary III-V semiconductor-based waveguide. The input optical path is then split into two modulation optical paths at a beam splitter. Each of the two modulation optical paths passes through a respective secondary III-V semiconductor-based waveguide, and the active phase modulating portion of the secondary III-V semiconductor-based waveguide. At a beam combiner, the modulation optical paths are combined and pass through the output side of the primary III-V semiconductor-based waveguide. The primary III-V semiconductor-based waveguide is coupled at its output end to an output silicon waveguide. The output optical path passes through the output silicon waveguide.

This arrangement may be realised by using a device coupon which comprises only one III-V semiconductor-based MZM. In this case one device coupon may be provided.

The phase shift keying modulator may include a quadrature phase shift keying modulator component.

The phase shift keying modulator may include a quadrature phase shift keying modulator component, the quadrature phase shift keying modulator component comprising:
two binary phase shift keying modulator components;
a parent beam splitter, the parent beam splitter splitting an input optical path into two binary modulator optical paths; and,
a parent beam combiner, the parent beam combiner combining the two binary modulator optical paths into an output optical path,
wherein the input optical path passes through an input silicon waveguide, each of the binary modulator optical paths pass through a respective binary phase shift keying modulator component, and the output optical path passes through an output silicon waveguide.

The quadrature phase shift keying modulator component is operable to modulate the phases of optical waves passing through the quadrature phase shift keying modulator component in accordance with a quadrature phase shift keying modulation scheme.

The optical path lengths of the quadrature modulator optical paths may be equal.

The parent beam splitter be a 1×2 multimode interferometer, a 1×2 Y split, or a 2×2 directional coupler. The parent beam combiner may be a 2×1 multimode interferometer, a 2×2 multimode interferometer or a 2×2 directional coupler.

The parent beam splitter and the parent beam combiner of the binary phase shift keying modulator may be provided on the silicon-on-insulator platform. The parent beam splitter and the parent beam combiner may be made of silicon. The parent beam splitter may be arranged such that it is orthogonal or substantially orthogonal to the beam splitter of the binary phase shift keying component, and/or the parent beam combiner may be arranged such that it is orthogonal or substantially orthogonal to the beam combiner of the binary phase shift keying component. By orthogonal, it may be meant that the parent splitter extends in a direction which is perpendicular to the direction in which the beam splitter or beam combiner extends. This setup allows the phase shift modulator to be compact and may reduce its dimensions, further it can simplify the electrode routing. Alternatively, the parent beam splitter may be arranged such that it is substantially parallel to the beam splitter of the binary phase shift keying component, and/or the parent beam combiner may be arranged such that it is substantially parallel to the beam combiner of the binary phase shift keying component. By parallel, it may be meant that the parent splitter extends in a direction which is parallel to the direction in which the beam splitter or beam combiner extends. This setup may reduce bending of the waveguides which may reduce optical waveguide bending loss, it can also reduce the overall width of the chip and may be more convenient for electrode routing.

The binary phase shift keying modulator components of a quadrature phase shift keying modulator component may take any of the arrangements of binary phase shift keying modulator components described above. For example, a III-V semiconductor-based device used in a binary phase shift keying modulator component of a quadrature phase shift keying modulator component may be a III-V semiconductor-based waveguide comprising a single optical path. A III-V semiconductor-based device used in a binary phase shift keying modulator component of a quadrature phase shift keying modulator component may be a III-V semiconductor-based MZMs.

A quadrature phase shift modulating component may comprise a combination of different III-V semiconductor-based devices. For example, one of the binary phase shift modulating components may include two III-V semiconductor-based waveguides each comprising only one optical path, and the other binary phase shift modulating component may include a III-V semiconductor-based MZM.

A quadrature phase shift keying modulator component may be implemented using any of the following device coupons. A quadrature phase shift keying modulator component may be implemented using device coupons which each comprise only one III-V semiconductor-based waveguide, the waveguide comprising a single optical path. In this case four device coupons may be provided. A quadrature phase shift keying modulator component may be implemented using device coupons which each comprise two III-V semiconductor-based waveguides, each waveguide comprising a single optical path. In this case two device coupons may be provided. A quadrature phase shift keying modulator component may be implemented using device coupons which each comprise only one III-V semiconductor-based MZM. In this case two device coupons may be provided. A quadrature phase shift keying modulator component may be implemented using a device coupon which comprises two III-V semiconductor-based MZMs. In this case one device coupon may be provided.

The quadrature phase shift modulating component may comprise a combination of different device coupons. For example, one of the binary phase shift modulating components may include a device coupon which comprises two III-V semiconductor-based waveguides, and the other binary phase shift modulating component may include a device coupon which comprises a III-V semiconductor-based MZM.

The phase shift keying modulator may include a dual polarization quadrature phase shift keying modulator component.

The phase shift keying modulator may include a dual polarization quadrature phase shift keying modulator component, the dual polarization quadrature phase shift keying modulator component comprising:

two quadrature phase shift keying modulator components;
a polarization beam splitter, the polarization beam splitter splitting an input optical path into two quadrature modulator optical paths; and,
a polarization beam combiner, the polarization beam combiner combining the two quadrature modulator optical paths into an output optical path, wherein the input optical path passes through an input silicon waveguide, each of the two quadrature modulator optical paths have respectively different polarization states and pass through a respective quadrature phase shift keying modulator component, and the output optical path passes through an output silicon waveguide.

The dual polarization quadrature phase shift keying modulator component is operable to modulate the phases of optical waves passing through the dual polarization quadrature phase shift keying modulator component in accordance with a quadrature phase shift keying modulation scheme.

The optical path lengths of the quadrature modulator optical paths may be equal.

The polarization beam splitter may be implemented as any structure which takes a light beam as an input and provides as an output two light beams of different polarization states. The different polarization states may be orthogonal polarization states. The two different polarization states may be a transverse electric polarization state and a transverse magnetic polarisation state. By transverse electric polarization state, it may be meant that the electric field of the electromagnetic wave is transverse to the direction of propagation while the magnetic field of the electromagnetic wave is normal to the direction of propagation. By transverse magnetic polarization state, it may be meant that the magnetic field of the electromagnetic wave is transverse to the direction of propagation while the electric field of the electromagnetic wave is normal to the direction of propagation. The polarization beam splitter may be a beam splitter which splits light into two beams based on polarization state of the light. For example, the polarization beam splitter could be an MZI waveguide based polarization splitter integrated in the silicon chip.

Similarly, the polarization beam combiner may be implemented as any structure which combines two light beams of different polarization states into a single beam of light. For example, the beam combiner could be an MZI waveguide based polarization splitter integrated in the silicon chip.

The polarization beam splitter and the polarization beam combiner may be integrated into the silicon-on-insulator platform or may be external to the silicon-on-insulator platform. The polarization beam splitter and the polarization beam combiner may be made of silicon.

The quadrature phase shift keying modulator components of a dual-polarization quadrature phase shift keying modulator component may take any of the arrangements described above with reference to quadrature phase shift keying modulator components. The quadrature phase shift modulating components of the dual polarization phase shift keying modulator component may each comprise different combinations of III-V semiconductor-based devices.

A dual polarization quadrature phase shift keying modulator component may be implemented using any of the following device coupons. A dual polarization quadrature phase shift keying modulator component may be implemented using device coupons which each comprise only one III-V semiconductor-based waveguide, the waveguide comprising only one optical path. In this case eight device coupons may be provided. A dual polarization quadrature phase shift keying modulator component may be implemented using device coupons which each comprise two III-V semiconductor-based waveguides, each waveguide comprising only one optical path. In this case four device coupons may be provided. A dual polarization quadrature phase shift keying modulator component may be implemented using device coupons which each comprise only one III-V semiconductor-based MZM. In this case four device coupons may be provided. A dual polarization quadrature phase shift keying modulator component may be implemented using device coupons which each comprise two III-V semiconductor-based MZMs. In this case two device coupons may be provided.

The dual polarization quadrature phase shift modulating component may comprise a combination of different device coupons.

The silicon-on-insulator platform of the phase shift keying modulator may comprise a substrate layer and a device layer. Device layer may be defined as the upper silicon layer of a silicon-on-insulator platform. The silicon-on-insulator platform may further comprise a platform insulator layer, the platform insulator layer being located between the device layer and the substrate layer. The platform insulator layer may be a buried oxide layer. The platform insulator layer may be composed of silicon dioxide (SiO2).

The silicon-on-insulator platform may comprise two platform insulator layers and two substrate layers, the first platform insulator layer being between the device layer and the first substrate layer, and the second platform insulator layer being between the first substrate layer and the second substrate layer so as to form a double silicon on insulator platform. An advantage of this is that the second platform insulator layer can serve as an etch stop, to easily and precisely control the air trench etching depth whilst the first platform insulator layer provides a base to hold the coupon above it.

The cavities of the silicon-on-insulator platform may be formed by etching layers of the platform away. The depth of the silicon-on-insulator cavity may be chosen such that the optical mode coupling efficiency between the III-V semiconductor-based waveguide and the silicon waveguides is maximised.

At least one of the one or more cavities may extend entirely through the device layer and only partially through the platform insulator layer, or the first platform insulator layer such that a portion of the platform insulator layer is on the bottom of the silicon-on-insulator cavity. The thickness of the platform insulator layer may be chosen such that the optical mode coupling efficiency between the III-V semiconductor-based waveguide and the silicon waveguides is maximised. At least one of the one or more cavities may extend entirely through the device layer and entirely through the platform insulator layer, or the first platform insulator layer. A cavity insulator layer may be provided on the base of the at least one cavity. The cavity insulator layer may be composed of SiO2. The cavity insulator layer may be composed of $Si_3N_4$. The thickness of the cavity insulator layer may be chosen such that the optical mode coupling efficiency between the III-V semiconductor-based waveguide and the silicon waveguides is maximised.

The phase shift keying modulator may comprise an insulation trench at the bottom of a silicon-on-insulator cavity. The insulating material of the insulation trench may be air. The insulation trench may lie in the substrate layer, or the first substrate layer. The insulation trench may be deposited such that it is beneath a region of a III-V semiconductor-based device, the region of the III-V semiconductor-based device being the region in electrical contact with the one or more contacts. When the III-V semiconductor-based device is provided on a device coupon, the insulation trench may lie between the device coupon and a portion of the substrate layer. A portion of the III-V semiconductor-based device may be in contact with the insulator of the insulation trench. When a III-V semiconductor-based device sits in a cavity on a platform insulator layer or a cavity insulator layer, a portion of the insulation trench may be located under the insulator layer. A portion of the platform insulator layer or the cavity insulator layer may be entirely etched away to allow etching of the insulation trench. The insulation trench in some examples is filled with air, which has a dielectric constant of 1. In other examples, the insulation trench may be filled with sol-gen or spin-on-glass.

The insulation trench may extend the bandwidth of the phase shift keying modulator, as the insulation trench may cause improved impedance matching to the RF source and improved electrical and optical velocity matching.

As stated previously, one or more contacts are in electrical contact with each active phase modulating portion of the phase shift keying modulator such that the phase shift keying modulator is operable to modulate the phase of an optical wave passing through each active phase modulating portion.

The one or more contacts may cover a portion of the silicon-on-insulator platform. The one or more contacts may cover a portion of the III-V coupon. The one or more contacts may be made of gold.

The one or more contacts may be electrodes. Electrodes may be travelling wave electrodes. By travelling wave electrode, it may be meant that the electrode comprises a transmission line conductor which conveys a signal along a path that is substantially parallel to the optical path of an active phase modulating portion. Electrodes may be signal electrodes or ground electrodes. By signal electrode, it may be meant that the electrode carries a signal for modulating the phase of an optical wave passing through an active phase modulating portion. By ground electrode it may be meant that the electrode is connected to ground.

The one or more contacts may be T-electrode segments of travelling wave electrodes. A T-electrode segment may be a conductor which branches out from the transmission line conductor of the travelling wave electrode, the T-electrode segments capacitively loaded by the main body of the electrode. The T-electrode segments may branch out from the signal electrodes or from the ground electrodes. The T-electrode segments may branch out from the signal electrodes and the ground electrodes.

Electrodes may be arranged in various configurations. Non-limiting examples of these configurations are as follows. An electrode configuration may be a coplanar waveguide electrode configuration, which comprises three electrodes, one signal electrode with two ground electrodes. An electrode configuration may be a coplanar strip electrode configuration, which comprises two electrodes, one signal and one ground electrode.

The electrodes may be radio frequency electrodes. That is, the signals carried by the electrodes may be radio frequency. The electrodes may be terminated with an external resistor by bonding. The electrodes may be terminated with a resistor which is integrated into the silicon-on-insulator platform. The characteristic impedance of the electrodes may be 25Ω, 30Ω, 40Ω and 50Ω.

In a second aspect, embodiments of the invention provide a method of manufacturing a phase shift keying modulator, the method comprising:
  providing a silicon-on-insulator platform, the silicon-on-insulator platform including a plurality of silicon waveguides located in a device layer of the silicon-on-insulator platform, and the silicon-on-insulator platform including one or more cavities;
  providing one or more device coupons, the device coupons comprising one or more III-V semiconductor-based devices, each III-V semiconductor based device including a III-V semiconductor based waveguide, the III-V semiconductor based waveguide including an active phase modulating portion;
  depositing each device coupon into a respective cavity of the silicon-on-insulator platform such that the III-V semiconductor-based waveguide of the or each device is coupled at an input end to one of the plurality of silicon waveguides and at an output end to another of the plurality of silicon waveguides; and,
  connecting one or more contacts in electrical contact with each active phase modulating portion to allow for modulating the phase of an optical wave passing through each active phase modulating portion.

The phase shift keying modulator manufactured using this method may have any one, or any combination insofar as they are compatible of the optional features set out below.

The phase shift keying modulator manufactured using this method may have any one, or any combination insofar as they are compatible of the optional features set out with reference to the first aspect of the invention.

The step of depositing each device coupon into a respective cavity of the silicon-on-insulator platform may be carried out using transfer printing or by flip chip bonding.

The device coupons provided in the method may comprise any of the arrangements of III-V semiconductor-based devices described with reference to the first aspect of the invention. The device coupons may be provided such that the phase shift keying modulator comprises a binary phase shift keying modulator component as described with reference to the first aspect of the invention. The device coupons may be provided such that the phase shift keying modulator comprises a quadrature phase shift keying modulator component as described with reference to the first aspect of the invention. The device coupons may be provided such that the phase shift keying modulator comprises a dual polarization quadrature phase shift keying modulator component as described with reference to the first aspect of the invention.

The method may further comprise a step of providing a beam splitter and a beam combiner such that the phase shift keying modulator comprises a binary phase shift keying modulator component, a quadrature phase shift keying modulator component, or a dual polarization phase shift keying modulator component as described with reference to the first aspect of the invention.

The method may further comprise the step of providing an insulation trench at the bottom of a silicon-on-insulator cavity. The insulation trench may be provided by etching away a portion of one or more layers of the silicon-on-insulator platform. The insulation trench provided in the method may have any of the features as described with reference to the first aspect of the invention.

In a third aspect, embodiments of the invention provide a silicon-on-insulator platform suitable for use in a phase shift keying modulator, the silicon-on-insulator platform comprising:
- a plurality of silicon waveguides located in a device layer of the silicon-on-insulator platform;
- one or more cavities, each cavity for receiving a device coupon, each device coupon comprising one or more III-V semiconductor-based devices, each III-V semiconductor based device including a III-V semiconductor based waveguide, the III-V semiconductor based waveguide including an active phase modulating portion, wherein when a device coupon is transfer printed into each cavity each III-V semiconductor based device is coupled at a first end to one of the plurality of silicon waveguides and at a second end to another of the plurality of silicon waveguides;
- a beam splitter, the beam splitter for splitting an input optical path into a plurality of modulation optical paths; and,
- a beam combiner, the beam combiner for combining the plurality of modulation optical paths into an output optical path, wherein the input optical path passes through an input silicon waveguide, each modulation optical path passes through a different active phase modulating portion, and the output optical path passes through an output silicon waveguide.

The substrate of the third aspect may have any one, or any combination insofar as they are compatible of the optional features set out with reference to the other aspects of the invention.

In a fourth aspect, embodiments of the invention provide a device coupon suitable for use in a phase shift keying modulator according to the first, second or third aspects of the invention. The device coupons of the fourth aspect may have any one, or any combination insofar as they are compatible of the optional features set out with reference to the other aspects of the invention.

Further aspects of the present invention provide: a computer program comprising code which, when run on a computer, causes the computer to perform the method of the second aspect; a computer readable medium storing a computer program comprising code which, when run on a computer, causes the computer to perform the method of the second aspect; and a computer system programmed to perform the method of the second aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
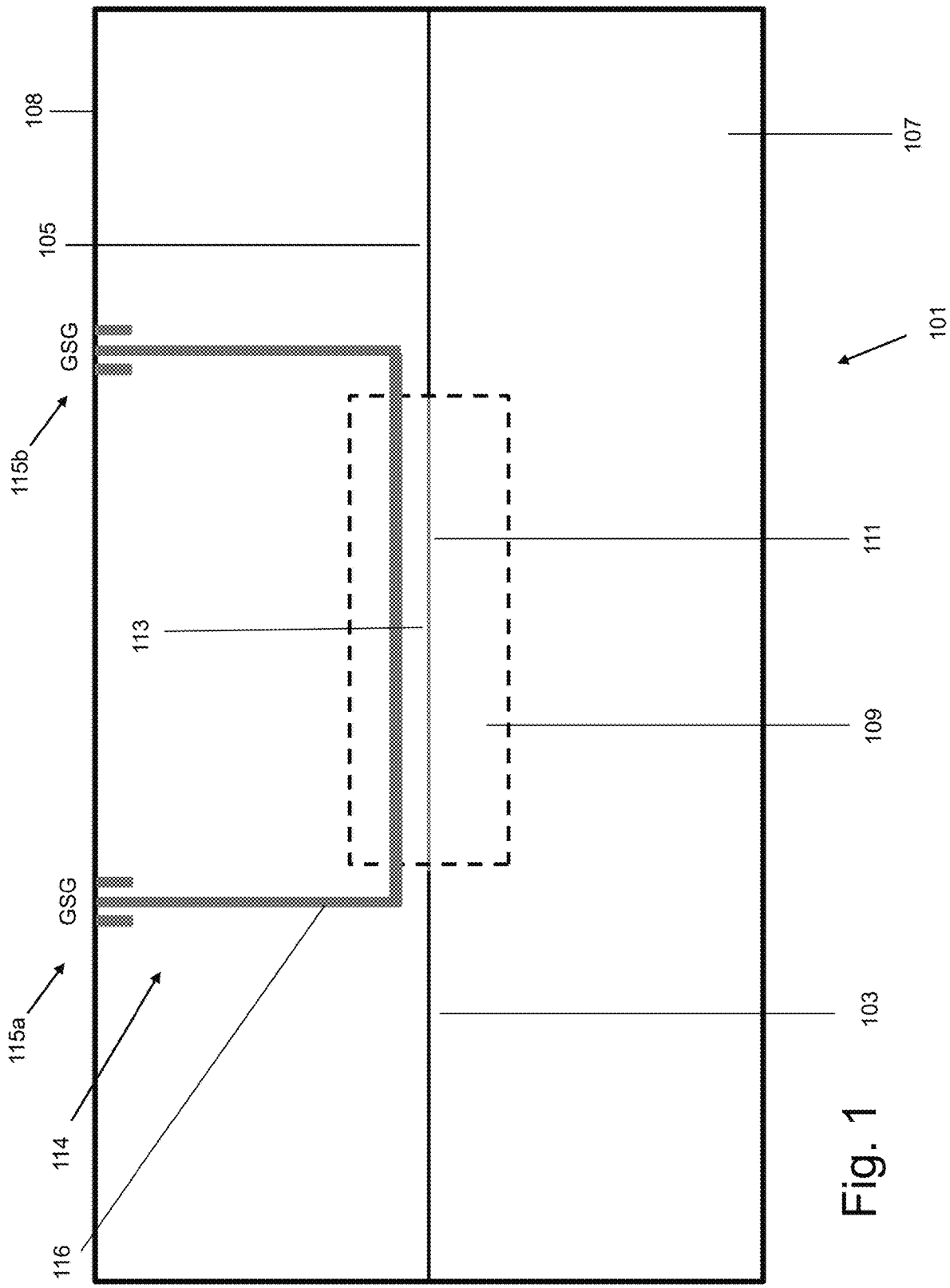
FIG. 1 shows a phase shift keying modulator according to an embodiment of the present invention.

FIG. 1 shows a phase shift keying modulator 101. The phase shift keying modulator 101 comprises a first silicon waveguide 103 and a second silicon waveguide 105 provided in a device layer of a silicon-on-insulator platform 107, with a silicon chip edge 108. The silicon-on-insulator platform includes a cavity 109. A III-V semiconductor-based device which is a III-V semiconductor-based waveguide 111 comprising a single optical path is located within the cavity 109. The III-V semiconductor-based waveguide 111 is coupled at an input end to the first silicon waveguide 103 and coupled at an output end to the second silicon waveguide 105. The III-V semiconductor-based waveguide 111 comprises an active phase modulating portion 113.

There is a radio frequency coplanar waveguide electrode configuration 114 in electrical contact with the active phase modulating portion 113, such that the phase shift keying modulator 101 is operable to modulate the phase of an optical wave passing through the active phase modulating portion 113. The radio frequency launch pads 115a and termination pads 115b are ground-signal-ground type (GSG). The centre signal line 116 denotes a traveling wave electrode, which is not necessarily just one electrode, as will be explained in further detail with reference to FIG. 17.

FIGS. 2 to 5 show device coupons 217, 317, 417, 517 on which III-V semiconductor-based devices 210, 310a, 310b, 410, 510a, 510b comprising active phase modulating portions 213, 313a, 313b, 413a, 413b, 513a, 513b, 513c, 513d for use in a phase shift keying modulator may be provided.

Figure 2:
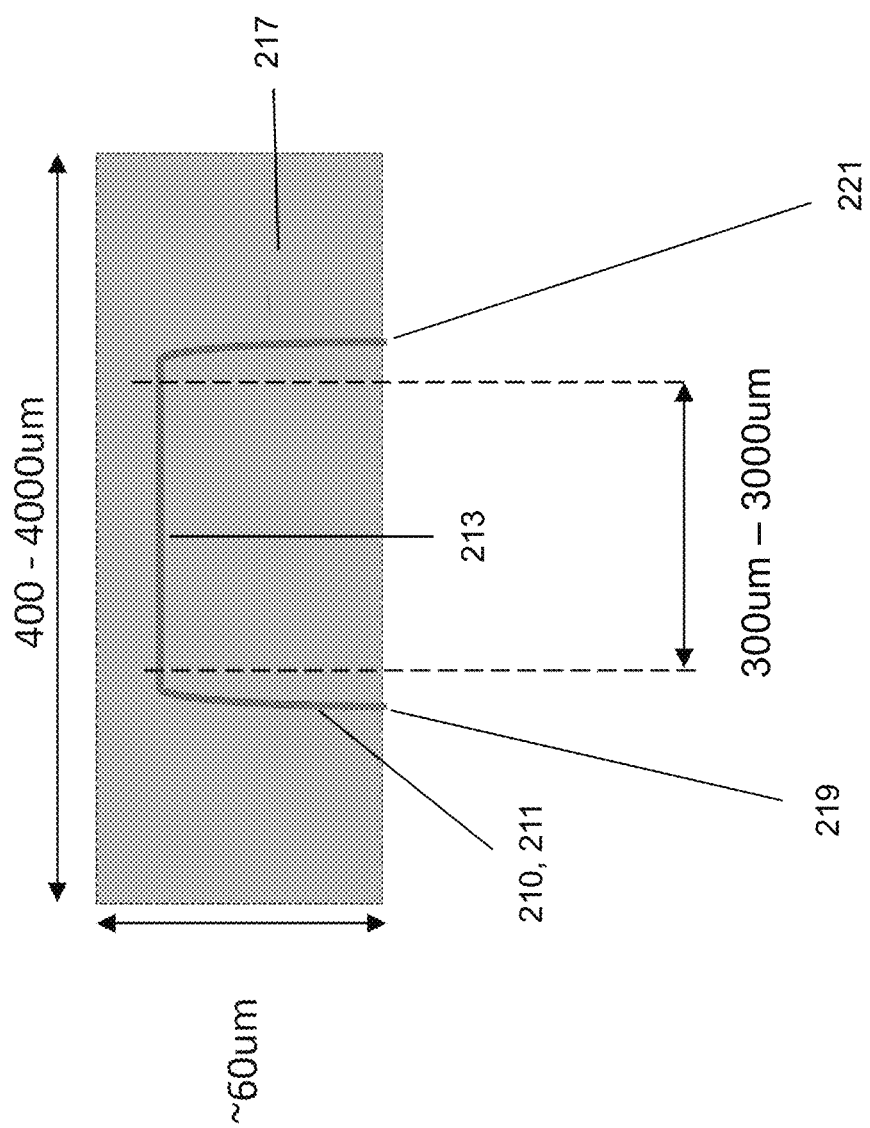
FIG. 2 shows a device coupon according to an embodiment of the present invention.

FIG. 2 shows a device coupon 217 on which there is only one III-V semiconductor-based device 210, the III-V semiconductor-based device 210 being a single III-V semiconductor-based waveguide 211 which comprises only one optical path. The III-V semiconductor-based waveguide 211 is U-shaped. The device coupon 217 has one input facet 219 and one output facet 221, and in this instance both facets are located on a same lateral side of the device coupon. The active phase modulating portion 213 may have a length of at least 300 microns and no more than 3000 microns. The device coupon may have a width of around 60 microns and a length of at least 400 microns and no more than 4000 microns.

Figure 3:
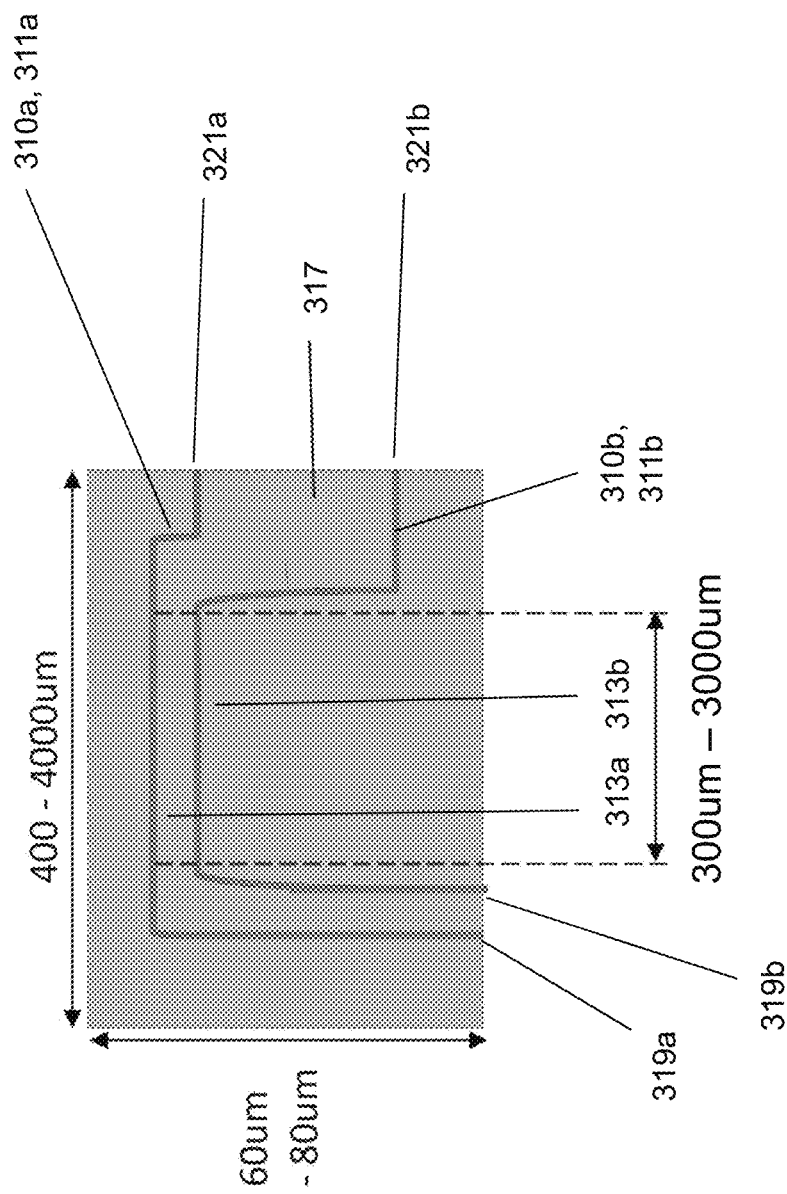
FIG. 3 shows a device coupon according to an embodiment of the present invention.

FIG. 3 shows a device coupon 317 which comprises two III-V semiconductor-based devices 310a, 310b, each of the two III-V semiconductor-based devices 310a, 310b being a single III-V semiconductor-based waveguide 311a, 311b which comprises only one optical path. Each of the III-V semiconductor-based waveguides 311a,311b comprises a U-shaped portion. The device coupon has two input facets 319a, 319b, hence why the device coupon is considered to contain two III-V semiconductor based devices (in contrast, see above and below, to device coupons which contain only one input facet and so are considered to contain one III-V semiconductor based device). The device coupon 317 also has two output facets 321a, 321b. The length of the active phase modulating portion 313a, 313b of each of the two III-V semiconductor-based waveguides 311a, 311b may be at least 300 and no more than 3000 microns. The device coupon 317 may have a width of at least 60 microns and no more than 80 microns and a length of at least 400 and no more than 4000 microns. In this example, the input facets are located on a different lateral side to the output facets.

Figure 4:
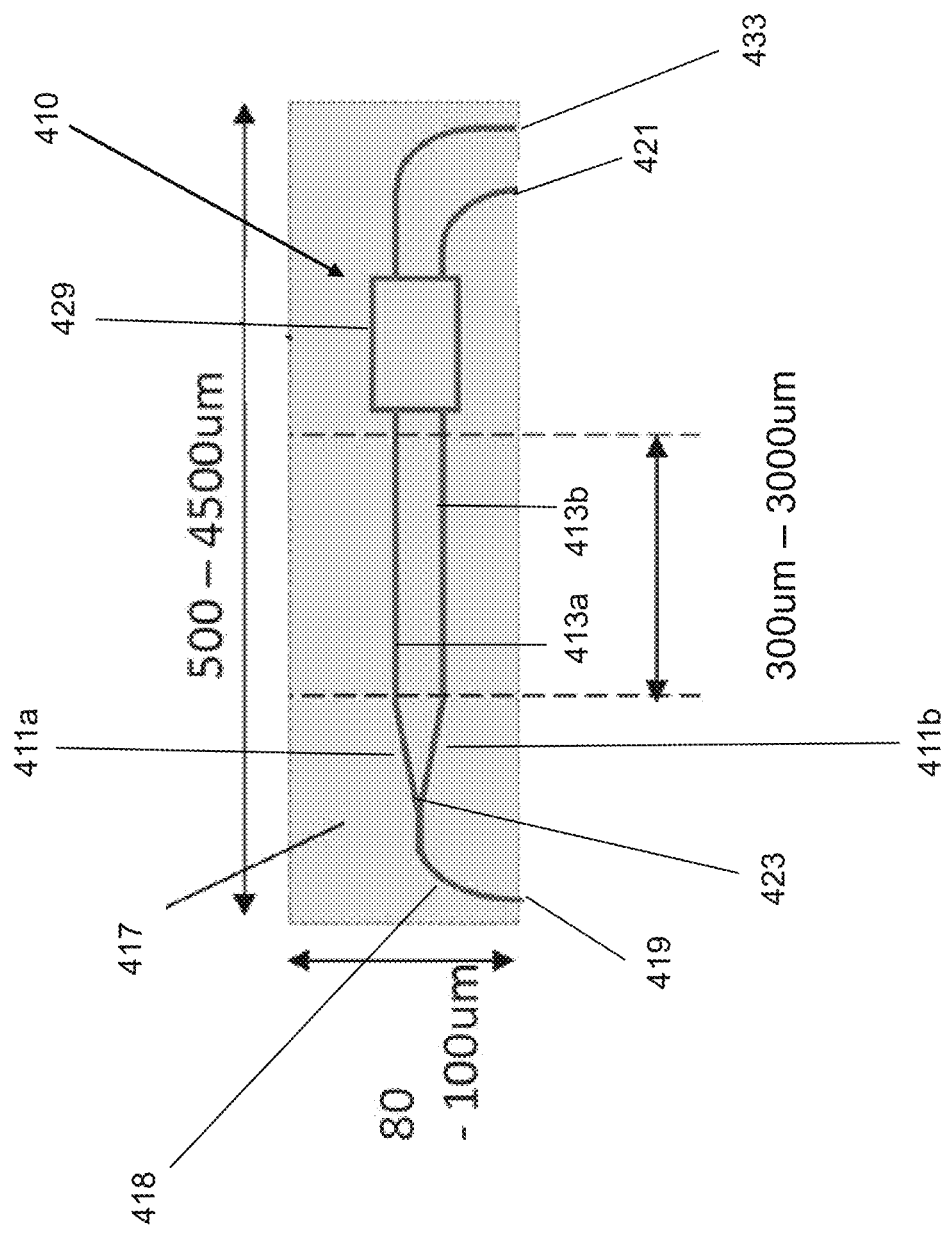
FIG. 4 shows a device coupon according to an embodiment of the present invention.

FIG. 4 shows a device coupon 417 which comprises only one III-V semiconductor-based device 410, the III-V semiconductor-based device 410 being a III-V semiconductor-based MZM. The III-V semiconductor-based MZM 410 comprises a primary III-V semiconductor-based waveguide 418 which is to be coupled at an input end 419 to one of a plurality of silicon waveguides and coupled at an output end 421 to another of a plurality of silicon waveguides of a silicon-on-insulator platform. The primary III-V semiconductor-based waveguide 418 comprises a 1×2 beam splitter 423 which splits the input side of the primary III-V semiconductor-based waveguide 418 into two secondary III-V semiconductor-based waveguides 411a, 411b. Each of the two secondary III-V semiconductor-based waveguides 411a, 411b comprises an active phase modulating portion 413a, 413b. The primary III-V semiconductor-based waveguide 418 further comprises a 2×2 beam combiner 429 which combines the two secondary III-V semiconductor-based waveguides 411a, 411b at the output side of the primary III-V semiconductor-based waveguide 418. The device coupon has one input facet 419 and two output facets 421, 433. A first output facet 421 is for coupling to one of a plurality of silicon waveguides, and a second output facet 433 is for coupling to a waveguide connecting the MZM 410 to a monitor for modulation DC bias monitoring. The length of the active phase modulating portions 413a, 413b of each of the two secondary III-V semiconductor-based waveguides 411a, 411b of the MZM may be at least 300 microns and no more than 3000 microns. The device coupon 417 may have a width of at least 80 microns and no more than 100 microns and a length of at least 500 microns and no more than 4500 microns.

Figure 5:
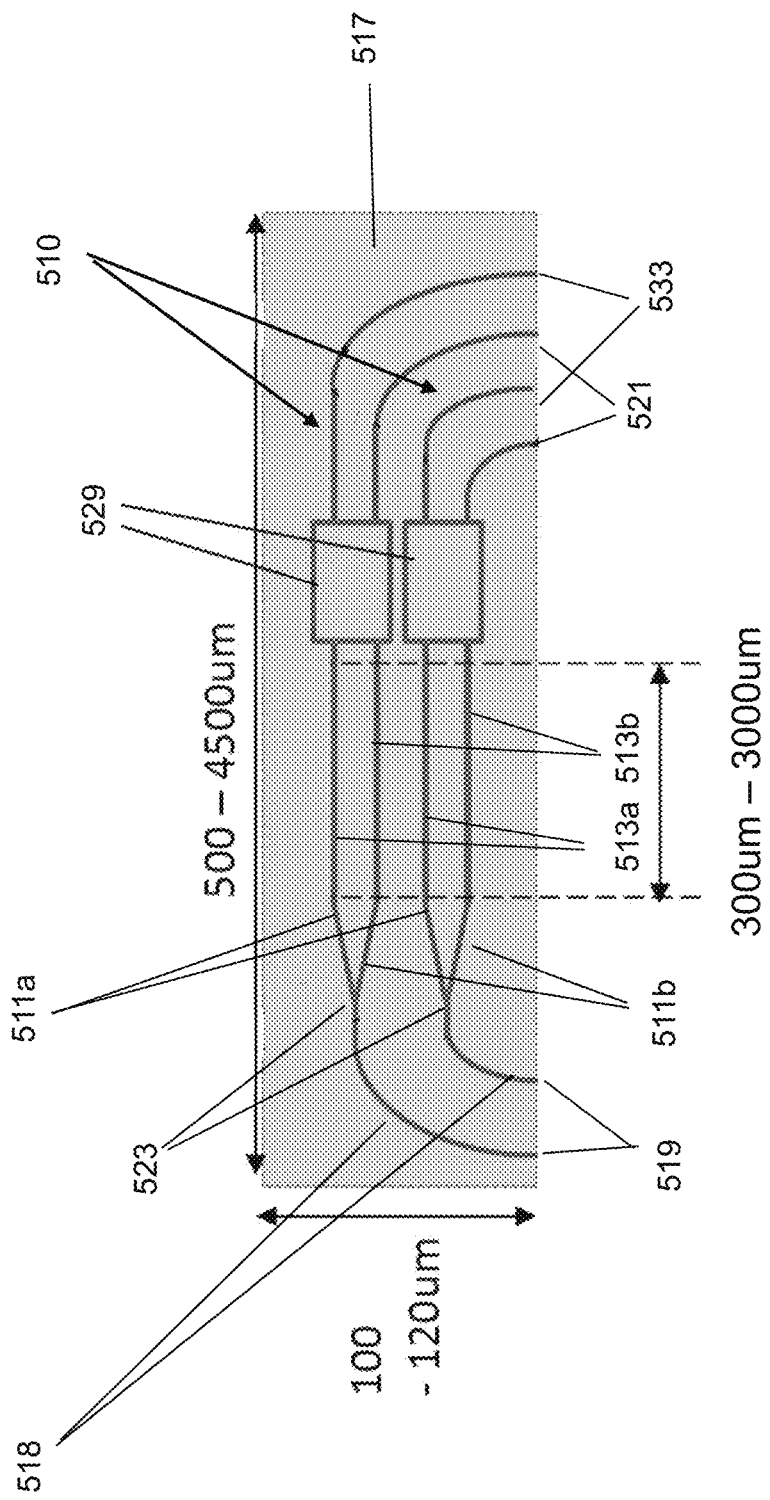
FIG. 5 shows a device coupon according to an embodiment of the present invention.

FIG. 5 shows a device coupon 517 which comprises two III-V semiconductor-based devices 510, each of the two III-V semiconductor-based devices 510 being a III-V semiconductor-based MZM. Each MZM 510 has the same structure as the single MZM 410 provided on the device coupon 417 described above with reference to FIG. 4. The two III-V semiconductor-based MZMs 510 are arranged in parallel, that is they generally extend in a same direction. The device coupon has two input facets 519 and four output facets 521, 533. The length of the active phase modulating portions 513a, 513b of each of the two III-V semiconductor-based waveguides 511a, 511b of each of the two MZMs 510 may be at least 300 microns and no more than 3000 microns. Each device coupon 517 has a width of at least 100 microns and no more than 200 microns and a length of at least 500 microns and no more than 4500 microns.

Figure 6:
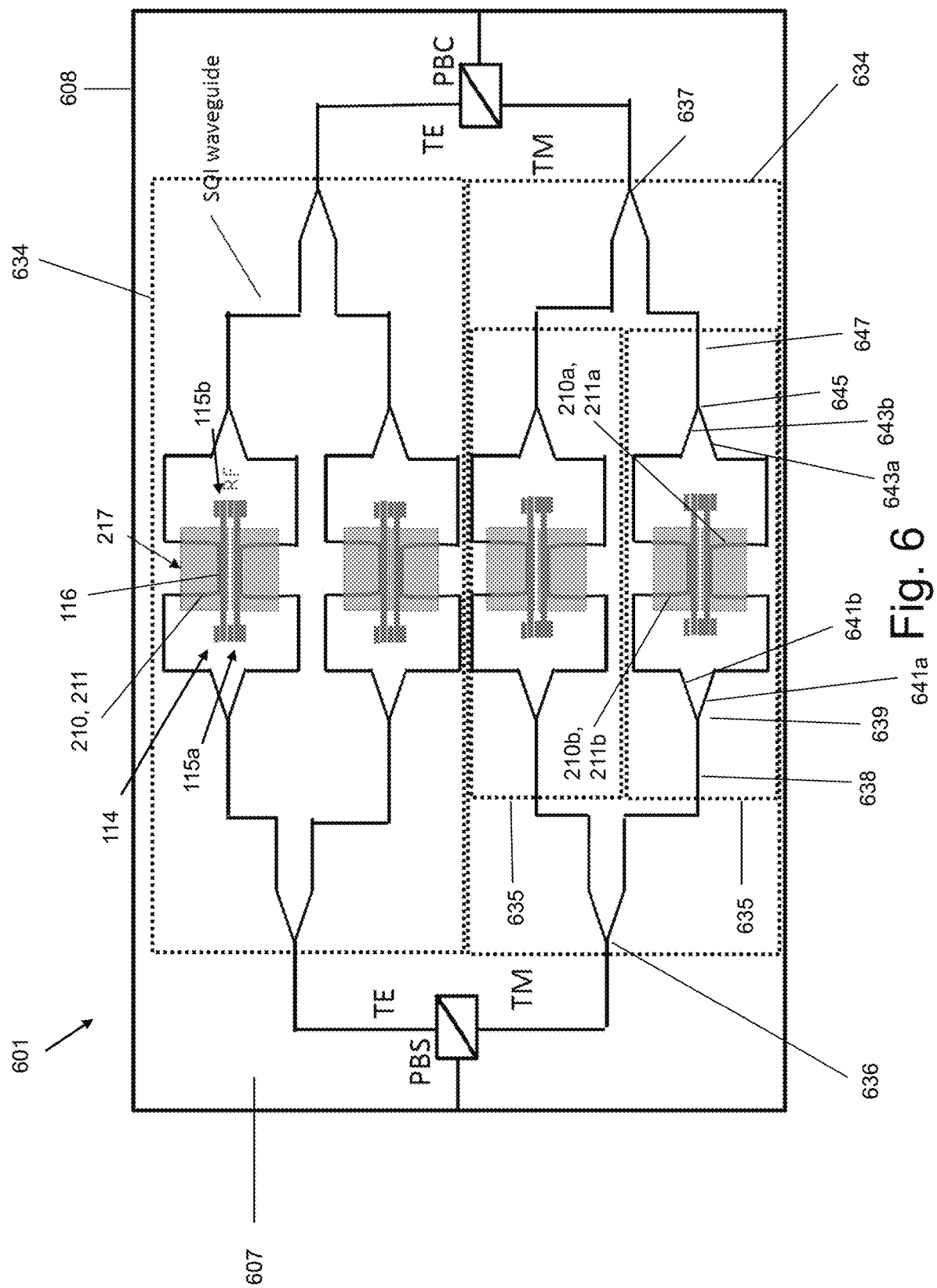
FIG. 6 shows a dual polarization phase shift keying modulator according to an embodiment of the present invention.

FIG. 6 shows a dual polarization quadrature phase shift keying modulator 601. The passive waveguides (SOI waveguide) are made of silicon, and the active phase modulating waveguides 211 are made of III-V semiconductors. The device coupons 217 provide the III-V semiconductor-based waveguides 211. These device coupons are shown in an enlarged view in FIG. 2. The device coupons 217 in this example are micro-transfer printed into respective cavities of the silicon-on-insulator platform 607, but in other examples may be provided through other means (e.g. flip-chip bonding). The dual polarization phase shift keying modulator 601 in this example includes 8 device coupons 217 as each device coupon includes only one III-V waveguide and correspondingly one active phase modulating portion.

The dual polarization quadrature phase shift keying modulator 601 comprises two quadrature phase shift keying modulator components 634 and a polarization beam splitter PBS. The polarization beam splitter PBS, in use, splits an input optical path into two quadrature modulator optical paths. The modulator 601 also includes a polarization beam combiner PBC which is configured to combine the two quadrature modulator optical paths into an output optical path. Each of the two quadrature modulator optical paths, in use, have respectively different polarization states (e.g. TE and TM) and pass through a respective quadrature phase shift keying modulator component 634. The two different polarization states in this example are transverse electric TE and transverse magnetic TM polarization states.

Each quadrature phase shift keying modulator component 634 comprises two binary phase shift keying modulator components 635, a parent beam splitter 636 and a parent beam combiner 637. The parent beam splitter 636 is configured to split an input optical path into two binary modulator optical paths and the parent beam combiner 637 is configured to combine the two binary modulator optical paths into an output optical path. Each of the binary modulator optical paths pass through a respective binary phase shift keying modulator component 635.

Each binary phase shift keying modulator component 635 comprises its own beam splitter 639, the beam splitter being configured to split an input optical path into two modulation optical paths. Each binary phase shift keying modulator component also includes its own a beam combiner 645, the beam combiner 645 being configured to combine the two modulation optical paths into an output optical path. Each of the two modulation optical paths pass through respective active phase modulating portions of III-V semiconductor-based waveguides 211.

Within a given binary phase shift keying modulator component 635 an optical path passes through as follows. An input optical path passes through a primary input silicon waveguide 638. The input optical path is then split into two modulation optical paths at and by the beam splitter 639. Each modulation optical path passes through a respective secondary input silicon waveguide 641a, 641b. The secondary input silicon waveguides 641a, 641b are each coupled to respective III-V semiconductor-based waveguides 211a, 211b at the input ends of the III-V semiconductor-based waveguides 211a, 211b. Each modulation optical path passes through its respective III-V semiconductor-based waveguide 211a, 211b, and the active phase modulating portion of the III-V semiconductor-based waveguide 211a, 211b. Each III-V semiconductor-based waveguide 211a, 211b is coupled at its output end to a respective secondary output silicon waveguide 643a, 64b. Each modulation optical path passes through its respective secondary output silicon waveguide 643a, 643b. The beam combiner 645 combines the optical paths of the two secondary output silicon waveguides 643a, 643b. The output optical path passes through a primary output silicon waveguide 647. The process is mirrored in each of the four binary phase keying modulators, which in combination form the two quadrature phase shift keying modulators (which in turn form the overall dual polarization quadrature phase shift keying modulator 601).

Figure 7:
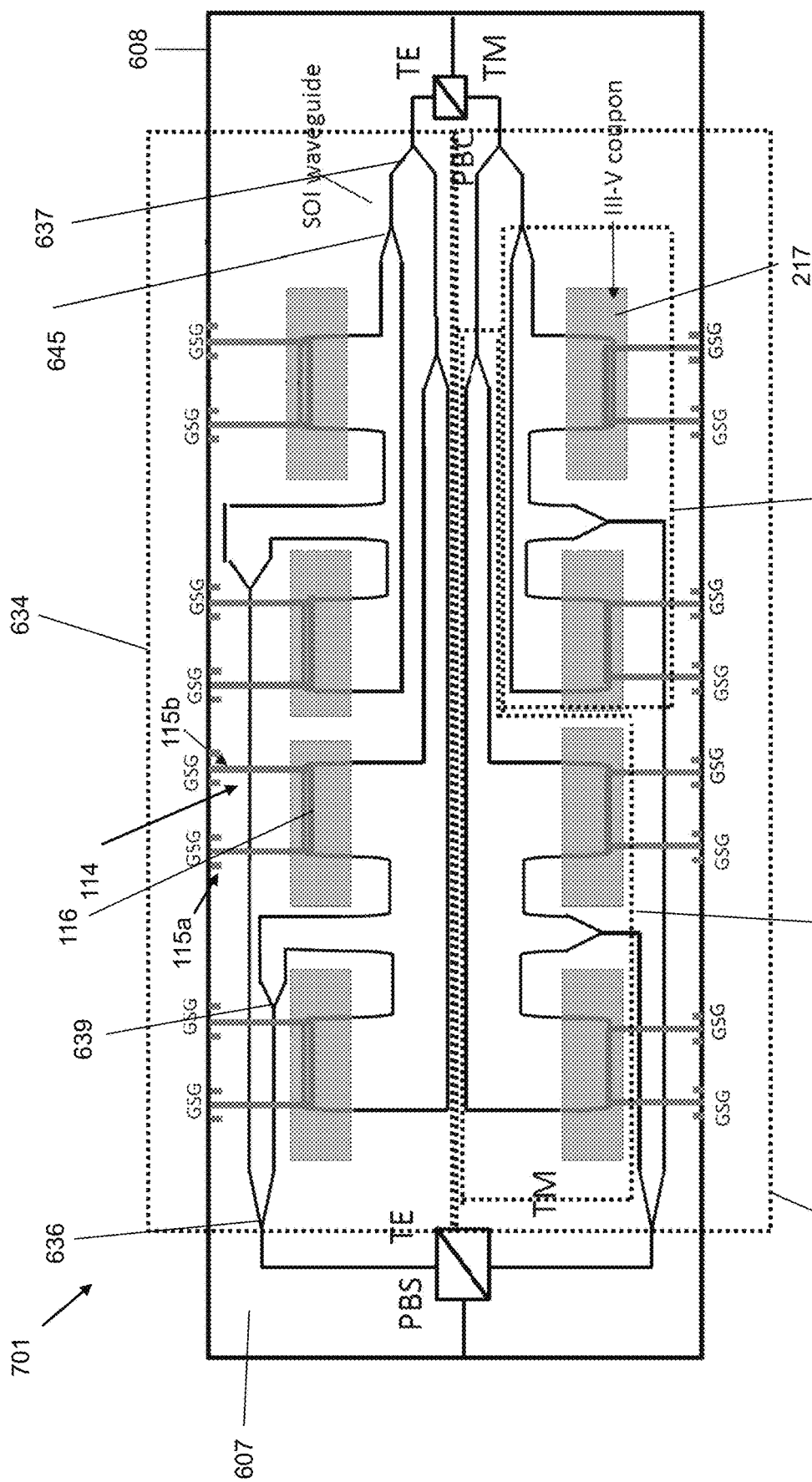
FIG. 7 shows a dual polarization phase shift keying modulator according to an embodiment of the present invention.
Figure 8:
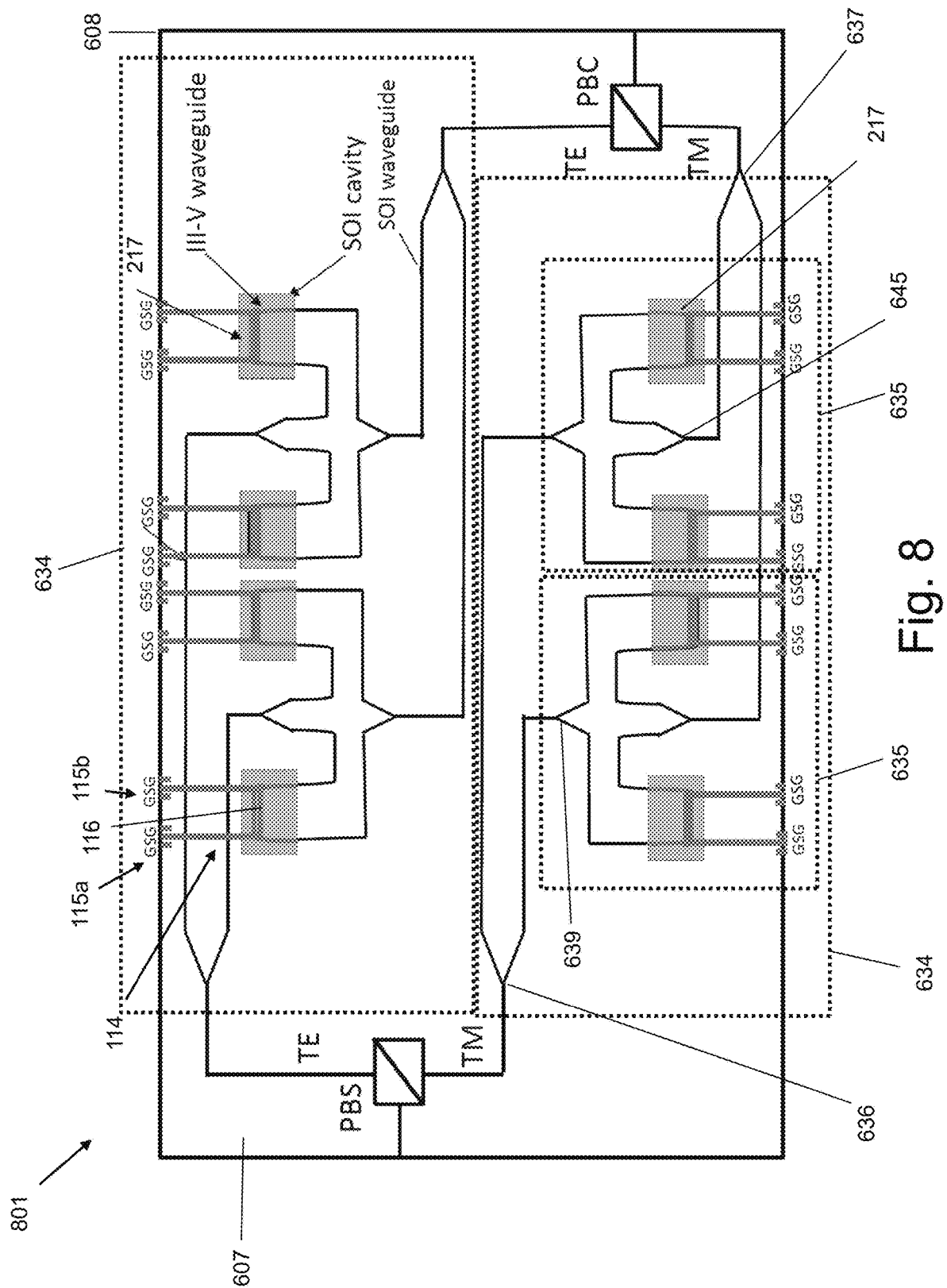
FIG. 8 shows a dual polarization phase shift keying modulator according to an embodiment of the present invention.

FIGS. 7 and 8 show dual polarization quadrature phase shift keying modulators 701, 801. These modulators 701, 801 use the same device coupons as the modulator 601 shown in FIG. 6. Like features are indicated by like reference numerals. They differ from the example shown in FIG. 6 by the spatial arrangement of the binary phase shift keying modulators 635 making up the respective dual polarization quadrature phase shift keying modulators.

The device coupons 217 in the modulators 601, 701, 801 of FIGS. 6, 7 and 8 are provided on the silicon-on-insulator platform 607 in different arrangements. For example, in the modulator 701 shown in FIG. 7, the parent beam splitters 636 of the quadrature phase shift keying components 634 are arranged such that they are parallel to the beam splitters 639 of the binary phase shift keying components 635, and the parent beam combiners 655 of the quadrature phase shift keying components 634 are arranged such that they are parallel to the beam combiners 645 of the binary phase shift keying components 635. In contrast, in the modulator 801 shown in FIG. 8, the parent beam splitters 636 of the quadrature phase shift keying components 634 are arranged such that they are orthogonal to the beam splitters 639 of the binary phase shift keying components 635, and the parent beam combiners 655 of the quadrature phase shift keying components 634 are arranged such that they are orthogonal to the beam combiners 645 of the binary phase shift keying components 655.

Figure 9:
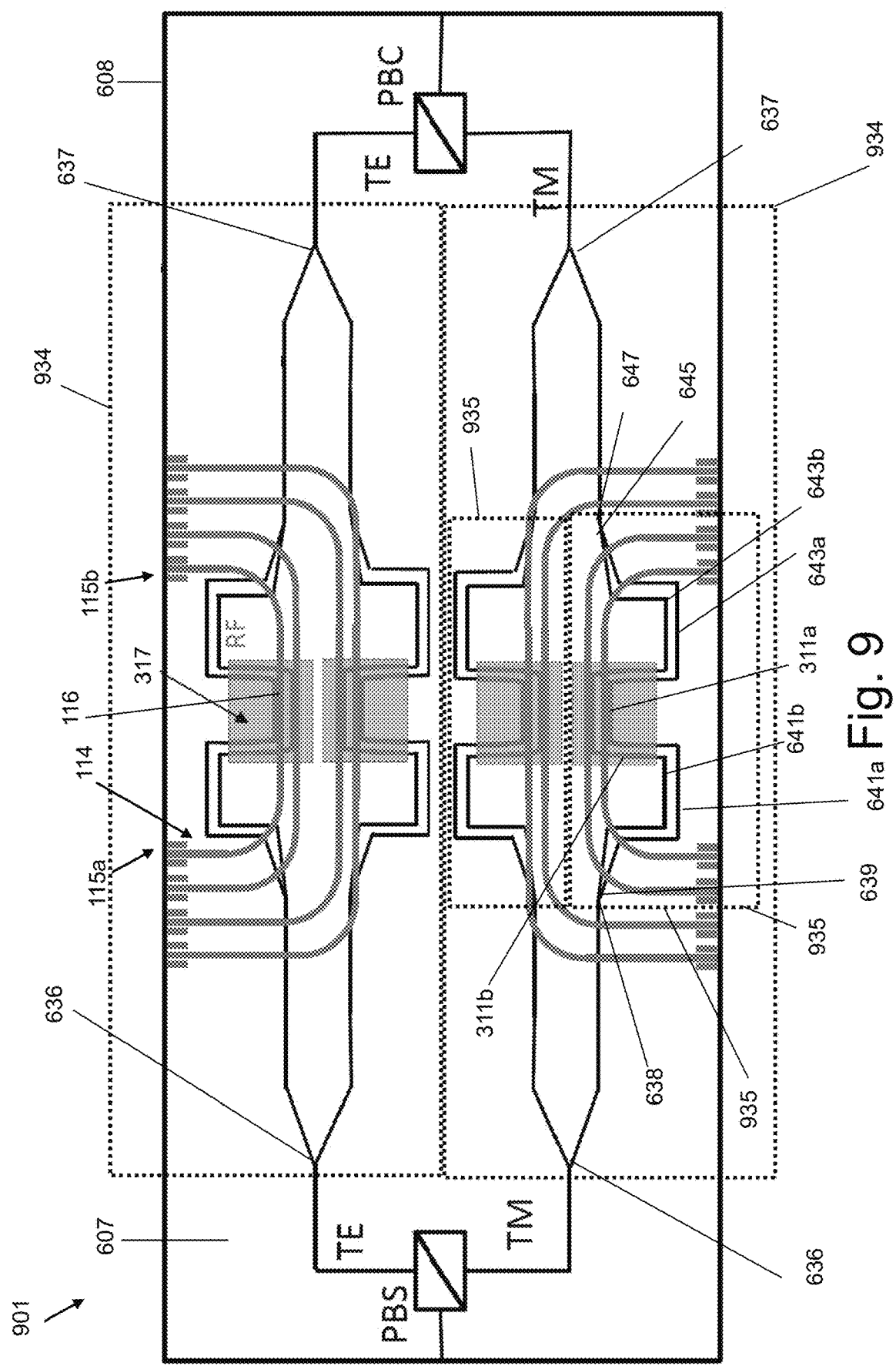
FIG. 9 shows a dual polarization phase shift keying modulator according to an embodiment of the present invention.

FIG. 9 shows a dual polarization quadrature phase shift keying modulator 901. This modulator 901 shares several features of the modulators 601, 701, 801 of FIGS. 6, 7, 8. Like features are indicated by like reference numerals.

Device coupons 317 provide the III-V semiconductor-based waveguides 311a, 311b. Each device coupon 317 includes two III-V semiconductor-based waveguides 311a, 311b. These device coupons 317 are shown in an enlarged view in FIG. 3. The device coupons 317 are micro-transfer printed into respective cavities of the silicon-on-insulator platform 607 but may, as discussed above, be provided through other means. The dual polarization phase shift keying modulator 901 in this example includes 4 device coupons 317 as each device coupon includes two III-V semiconductor-based waveguides 311a, 311b each with a respective active phase modulating portion.

The dual polarization quadrature phase shift keying modulator 901 comprises two quadrature phase shift keying modulator components 934 and a polarization beam splitter PBS. The polarization beam splitter PBS is configured to split an input optical path into two quadrature modulator optical paths. The modulator also includes a polarization beam combiner PBC, the polarization beam combiner PBC combining the two quadrature modulator optical paths into an output optical path. Each of the two quadrature modulator optical paths, in use, have respectively different polarization states TE, TM and pass through a respective quadrature phase shift keying modulator components 934. The two different polarization states are transverse electric TE and transverse magnetic TM polarization states.

Each quadrature phase shift keying modulator component 934 comprises two binary phase shift keying modulator components 935, a parent beam splitter 636, and a parent beam combiner 637. The parent beam splitter 636 is configured to split an input optical path into two binary modulator optical paths and the parent beam combiner 637 is configured to combine the two binary modulator optical paths into an output optical path. Each of the binary modulator optical paths pass through a respective binary phase shift keying modulator component 935.

As before, each binary phase shift keying modulator component 935 comprises a beam splitter 638 which is configured to split an input optical path into two modulation optical paths, and a beam combiner 645 which is configured to combine the two modulation optical paths into an output optical path. Each of the two modulation optical paths pass through respective active phase modulating portions of III-V semiconductor-based waveguides 311a, 311b.

Within a given binary phase shift keying modulator component 935 an optical path passes through as follows. An input optical path passes through a primary input silicon waveguide 638. The input optical path is then split into two modulation optical paths at and by the silicon beam splitter 639. Each two modulation optical path passes through a respective secondary input silicon waveguide 641a, 641b. The secondary input silicon waveguides 641a, 641b are each coupled to respective III-V semiconductor-based waveguides 311a, 311b at the input ends of the III-V semiconductor-based waveguides 311a, 311b. Each modulation optical path passes through its respective III-V semiconductor-based waveguide 311*a*, 311*b*, and the active phase modulating portion of the III-V semiconductor-based waveguide 311*a*, 311*b*. Each III-V semiconductor-based waveguide 311*a*, 311*b* is coupled at its output end to a respective secondary output silicon waveguide 643*a*, 643*b*. Each modulation optical path passes through its respective secondary output silicon waveguide 643*a*, 643*b*. A silicon beam combiner 645 combines the optical paths of the two secondary output silicon waveguides 643*a*, 643*b*. The output optical path passes through a primary output silicon waveguide 647. The process is mirrored in each of the four binary phase keying modulators 935, which in combination form the two quadrature phase shift keying modulators 934 (which in turn form the overall dual polarization quadrature phase shift keying modulator 901).

Figure 10:
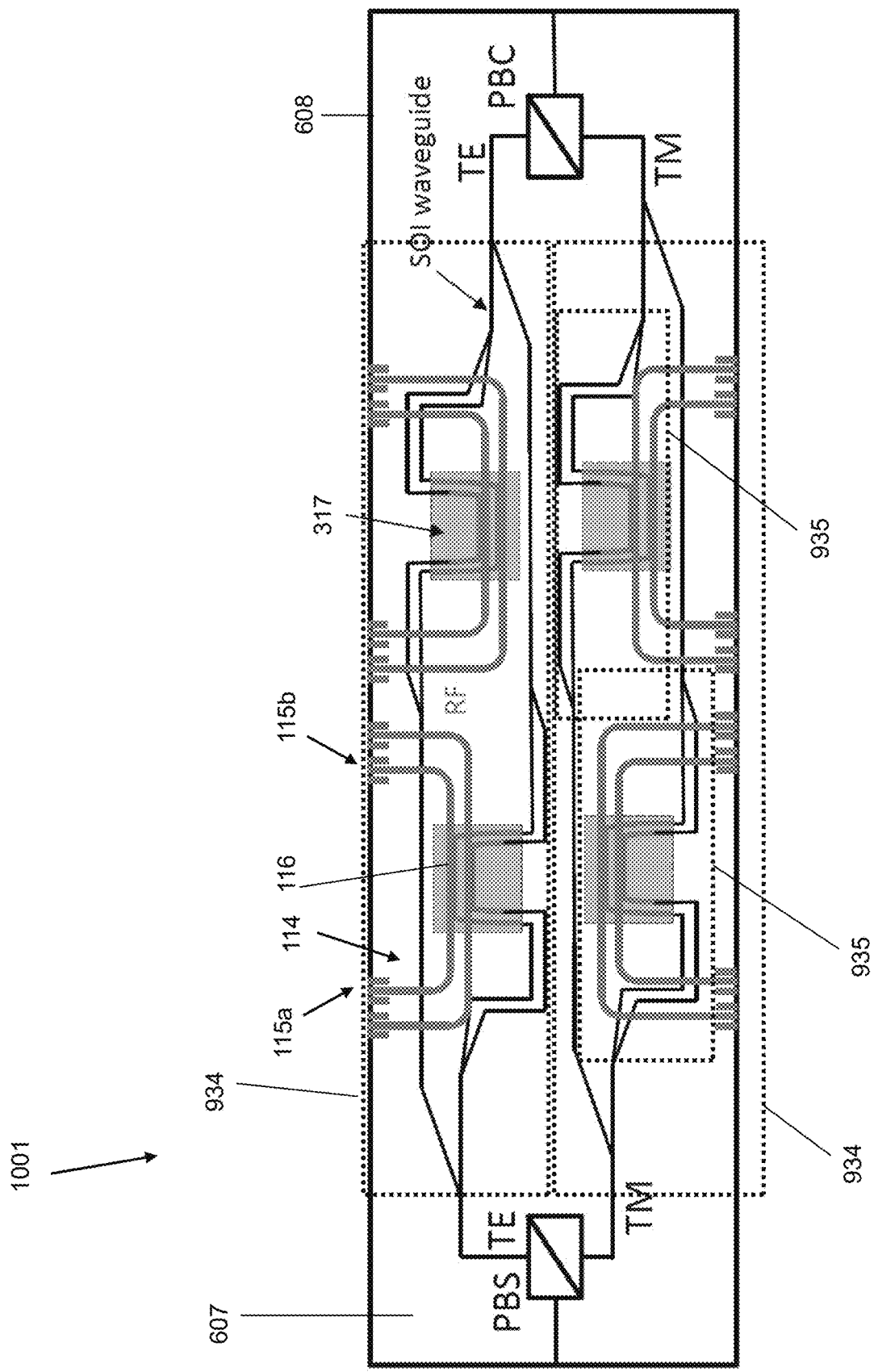
FIG. 10 shows a dual polarization phase shift keying modulator according to an embodiment of the present invention.
Figure 11:
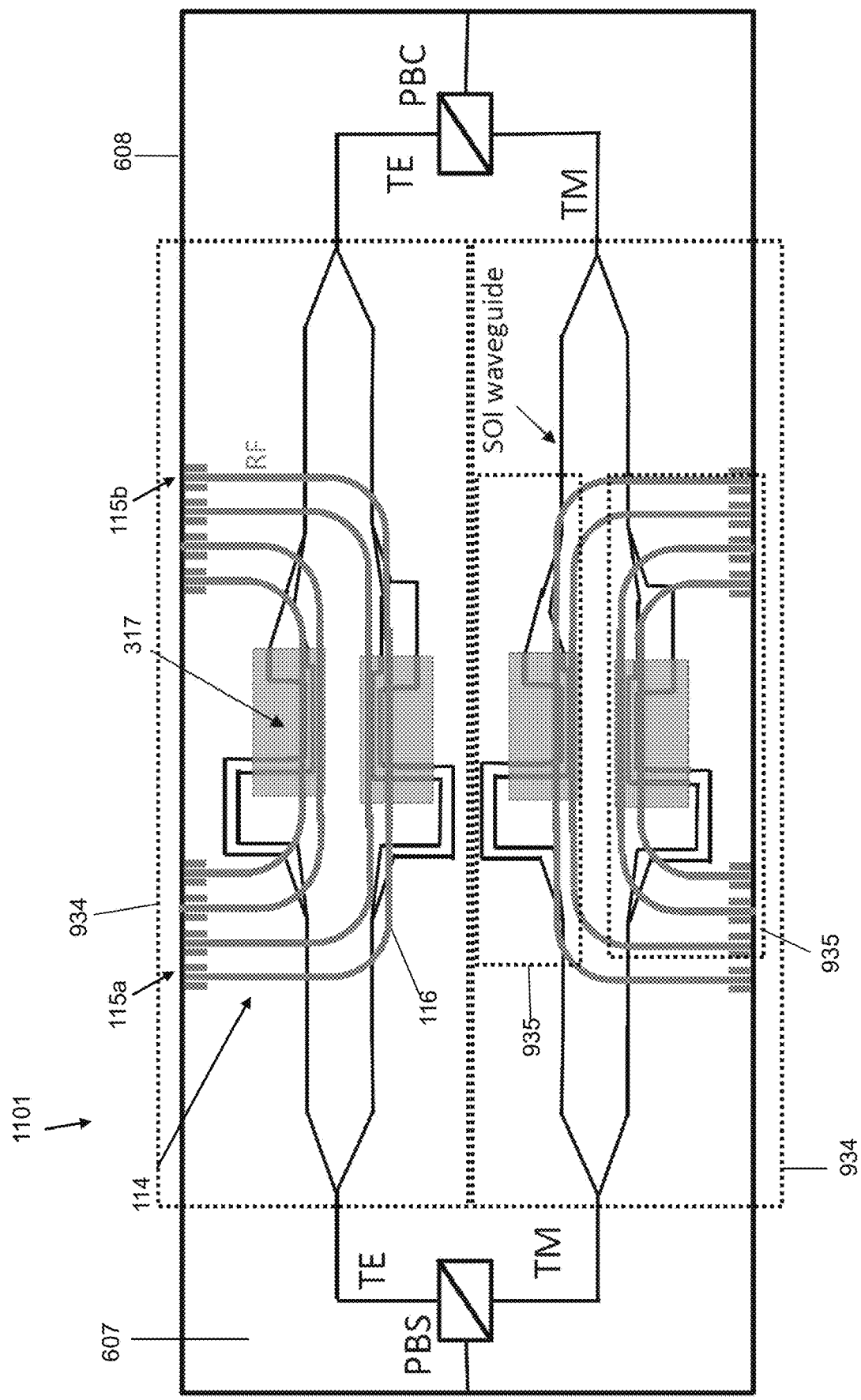
FIG. 11 shows a dual polarization phase shift keying modulator according to an embodiment of the present invention.
Figure 12:
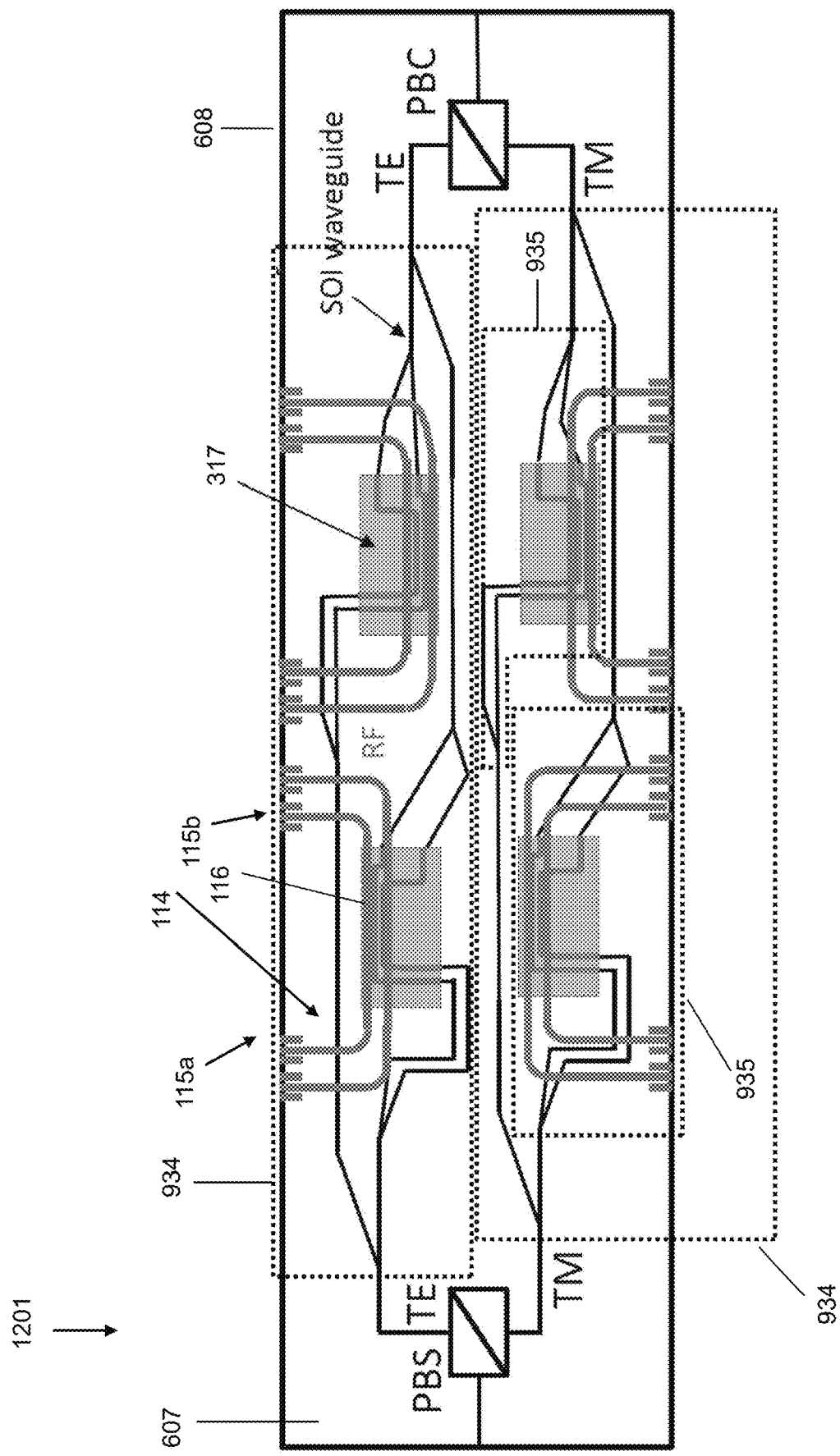
FIG. 12 shows a dual polarization phase shift keying modulator according to an embodiment of the present invention.

FIGS. 10, 11 and 12 show dual polarization quadrature phase shift keying modulators 1001, 1101, 1201. These modulators 1001, 1101, 1201 use the same device coupons 317 as the modulator 901 shown in FIG. 9. Like features are indicated by like reference numerals. They differ from the example shown in FIG. 9 by the spatial arrangement of the binary phase shift keying modulators 935 making up the respective dual polarization quadrature phase shift keying modulators. The device coupons 317 in the dual polarization quadrature phase shift keying modulators 901, 1001, 1101, 1201 shown in FIGS. 9, 10, 11, 12 are provided on the silicon-on-insulator platform 607 in different arrangements.

Figure 13:
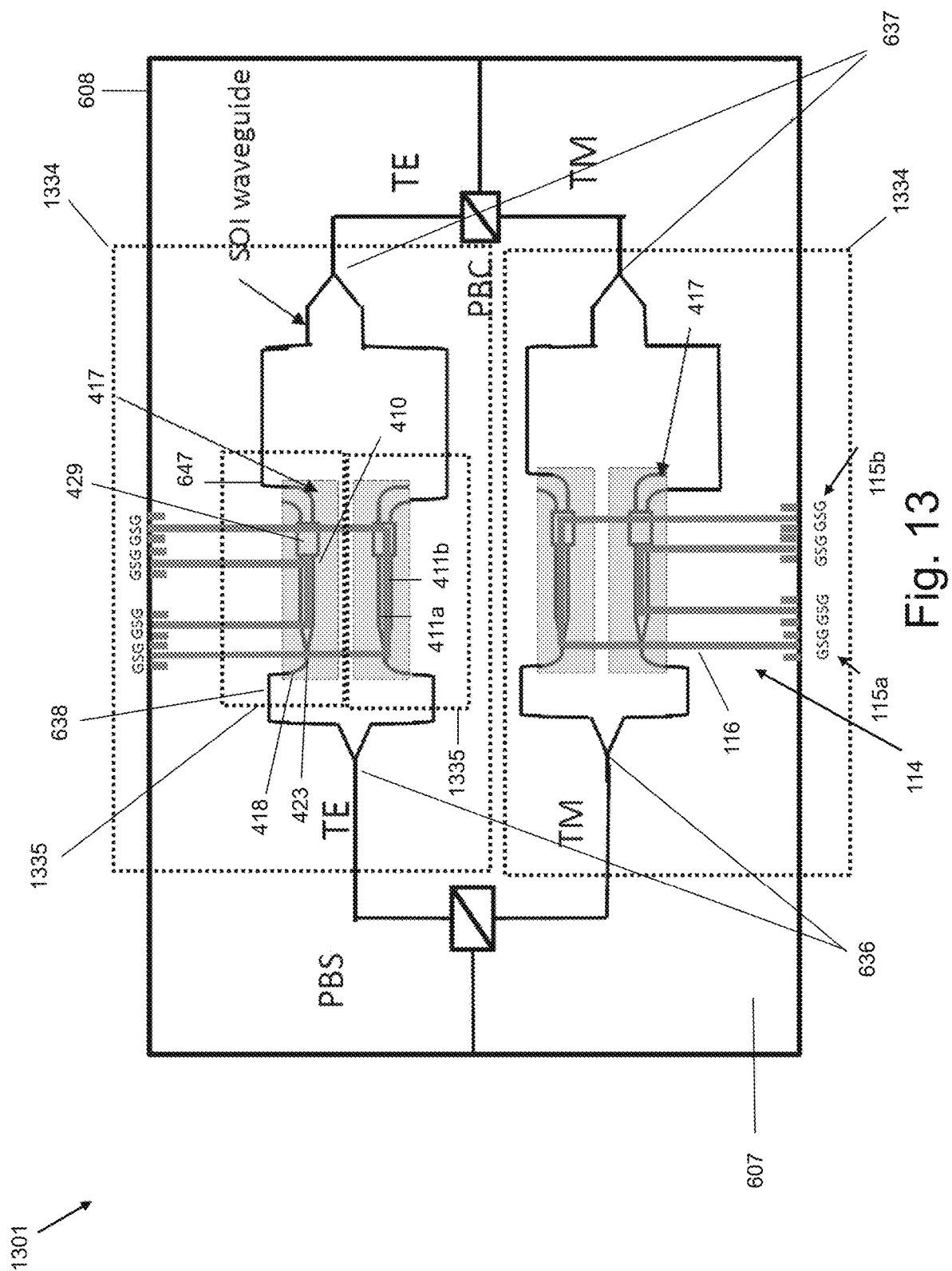
FIG. 13 shows a dual polarization phase shift keying modulator according to an embodiment of the present invention.

FIG. 13 shows a dual polarization quadrature phase shift keying modulator 1301. This modulator 1301 shares some features of the modulators discussed above. Like features are indicated by like reference numerals. It differs from the examples shown previously in that each device coupon 417 includes an MZI 410, as is discussed in detail below.

Device coupons 417 provide III-V semiconductor-based MZMs 410 which comprise the III-V semiconductor-based waveguides 411*a*, 411*b*. These device coupons 417 are shown in an enlarged view in FIG. 4. The device coupons 417 are micro-transfer printed into respective cavities of the silicon-on-insulator platform 607 but may, as discussed above, be provided in other ways. The dual polarization phase shift keying modulator 1301 includes 4 device coupons 417 as each device coupon includes one III-V semiconductor-based MZM 410 and correspondingly two III-V semiconductor-based waveguides 411*a*, 411*b*, each with an active phase modulating portion.

The dual polarization quadrature phase shift keying modulator 1301 comprises two quadrature phase shift keying modulator components 1334 and a polarization beam splitter PBS. The polarization beam splitter PBS is configured to split an input optical path into two quadrature modulator optical paths. The modulator also includes a polarization beam combiner PBC which is configured to combine the two quadrature modulator optical paths into an output optical path. Each of the two quadrature modulator optical paths, in use, have respectively different polarization states (e.g. TE and TM) and pass through a respective quadrature phase shift keying modulator components 1334. The two different polarization states in this example are transverse electric TE and transverse magnetic TM polarization states.

Each quadrature phase shift keying modulator component 1334 comprises two binary phase shift keying modulator components 1335, a parent beam splitter 636, and a parent beam combiner 637. The parent beam splitter 636 is configured to split an input optical path into two binary modulator optical paths and the parent beam combiner 637 is configured to combine the two binary modulator optical paths into an output optical path. Each of the binary modulator optical paths pass through a respective binary phase shift keying modulator component 1335.

Each binary phase shift keying modulator component 1335 comprises its own beam splitter 423, the beam splitter being configured to split an input optical path into two modulation optical paths. Each binary phase shift keying modulator component also includes its own beam combiner 429, the beam combiner combining the two modulation optical paths into an output optical path. Each of the two modulation optical paths pass through respective active phase modulating portions of III-V semiconductor-based waveguides 411*a*, 411*b*.

Within a given binary phase shift keying modulator component 1335 an optical path passes through as follows. An input optical path passes through an input silicon waveguide 638. The input silicon waveguide 638 is coupled to a primary III-V semiconductor-based waveguide 418 at the input end of the primary III-V semiconductor-based waveguide 418. The optical path passes into the input side of the primary III-V semiconductor-based waveguide 418. The input optical path is then split into two modulation optical paths at and by a III-V semiconductor-based beam splitter 423. Each of the two modulation optical paths passes through a respective secondary III-V semiconductor-based waveguide 411*a*, 411*b*, and the corresponding active phase modulating portion of the respective secondary III-V semiconductor-based waveguide 411*a*, 411*b*. At and by a III-V semiconductor-based beam combiner 429, the modulation optical paths are combined and pass through the output side of the primary III-V semiconductor-based waveguide 418. The primary III-V semiconductor-based waveguide 418 is coupled at its output end to an output silicon waveguide 647. The output optical path passes through the output silicon waveguide 647. The process is mirrored in each of the four binary phase keying modulators 1335, which in combination form the two quadrature phase shift keying modulators 1334 (which in turn form the overall dual polarization quadrature phase shift keying modulator 1301).

Figure 14:
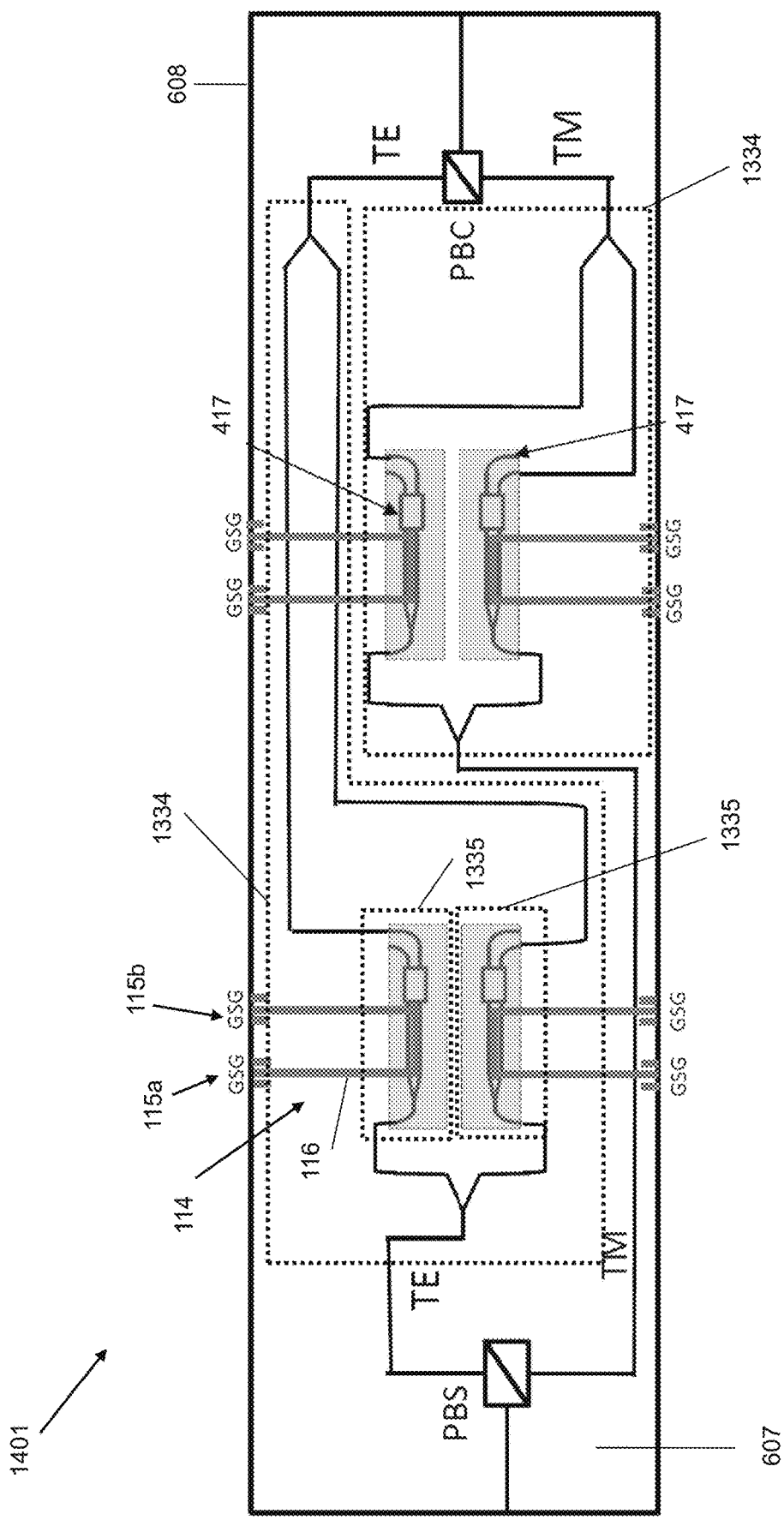
FIG. 14 shows a dual polarization phase shift keying modulator according to an embodiment of the present invention.

FIG. 14 shows a dual polarization quadrature phase shift keying modulator 1401. This modulator 1401 uses the same device coupons 417 as the modulator 1301 shown in FIG. 13. Like features are indicated by like reference numerals. It differs from the example shown in FIG. 13 by the spatial arrangement of the binary phase shift keying modulators 1335 making up the respective dual polarization quadrature phase shift keying modulators. The device coupons 417 in the dual polarization quadrature phase shift keying modulators 1301, 1401 shown in FIGS. 13 and 14 are provided on the silicon-on-insulator platform 607 in different arrangements.

Figure 15:
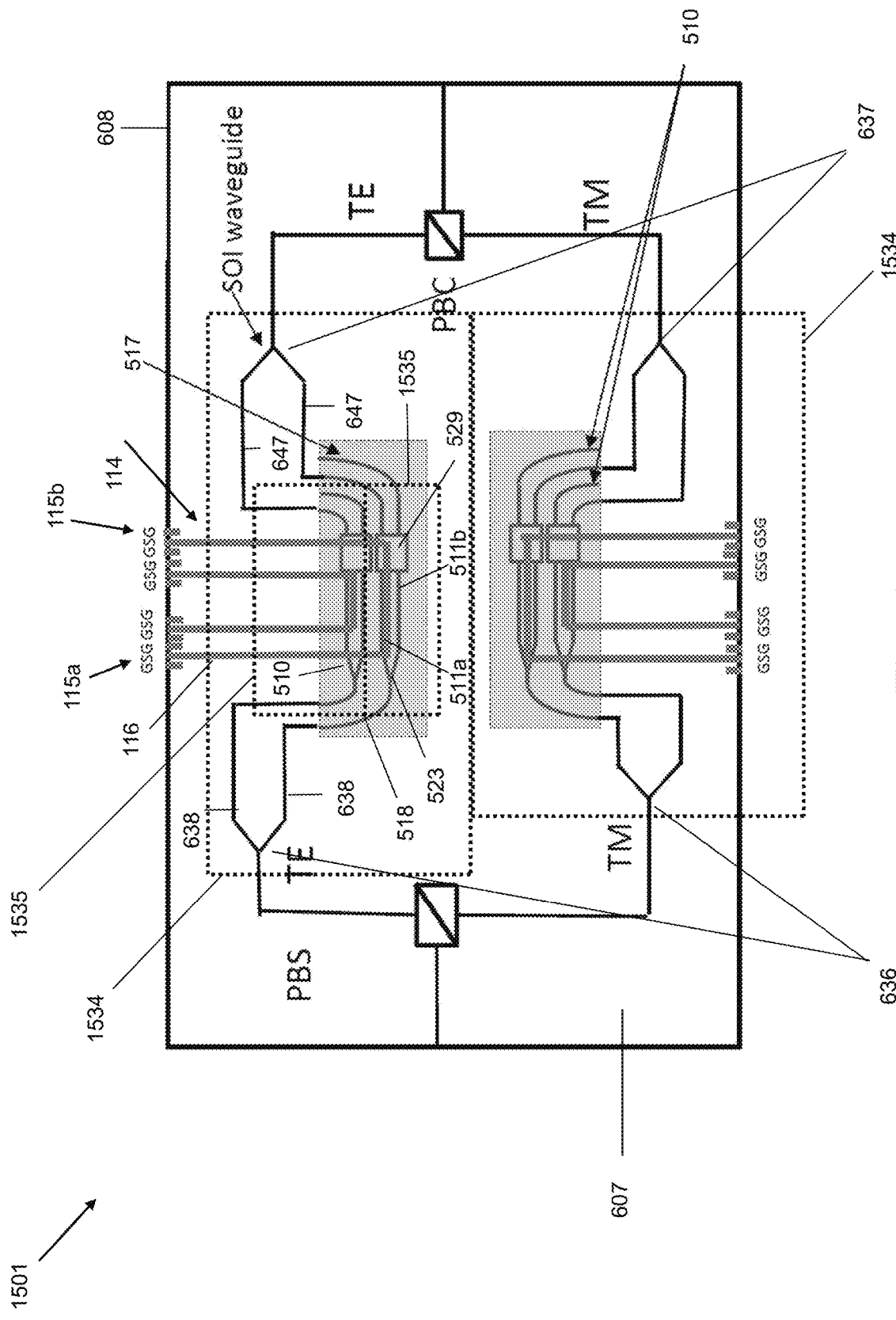
FIG. 15 shows a dual polarization phase shift keying modulator according to an embodiment of the present invention.

FIG. 15 shows a dual polarization quadrature phase shift keying modulator 1501. This modulator 1501 shares some features of the modulators discussed above. Like features are indicated by like reference numerals.

Device coupons 517 provide the III-V semiconductor-based waveguides 511*a*, 511*b* within III-V semiconductor-based MZMs 510. These device coupons 517 are shown in an enlarged view in FIG. 5. The device coupons 517 are micro-transfer printed into respective cavities of the silicon-on-insulator platform 607 but may, as discussed above, be provided in other ways. The dual polarization phase shift keying modulator 1501 includes 2 device coupons 517 as each device coupon includes two III-V semiconductor-based MZMs 510 and correspondingly four III-V semiconductor-based waveguides 411*a*, 411*b*, each with an active phase modulating portion.

The dual polarization quadrature phase shift keying modulator 1501 comprises two quadrature phase shift keying modulator components 1534 and a polarization beam splitter PBS. The polarization beam splitter PBS is configured to split an input optical path into two quadrature modulator optical paths. The modulator also includes a polarization beam combiner PBC, which is configured to combine the two quadrature modulator optical paths into an output optical path. Each of the two quadrature modulator optical paths, in use, have respectively different polarization states (e.g. TE and TM) and pass through a respective quadrature phase shift keying modulator components 1534. The two different polarization states in this example are transverse electric TE and transverse magnetic TM polarization states.

Each quadrature phase shift keying modulator component 1534 comprises two binary phase shift keying modulator components 1535, a parent beam splitter 636, and a parent beam combiner 637. The parent beam splitter 636 is configured to split an input optical path into two binary modulator optical paths and the parent beam combiner 637 is configured to combine the two binary modulator optical paths into an output optical path. Each of the binary modulator optical paths pass through a respective binary phase shift keying modulator component 1535.

Each binary phase shift keying modulator component 1335 comprises its own beam splitter 523, the beam splitter 523 being configured to split an input optical path into two modulation optical paths. Each binary phase shift keying modulator component also includes its own beam combiner 529, the beam combiner combining the two modulation optical paths into an output optical path. Each of the two modulation optical paths pass through respective active phase modulating portions of III-V semiconductor-based waveguides 511a, 511b.

Within a given binary phase shift keying modulator component 1535 an optical path passes through as follows. An input optical path passes through an input silicon waveguide 638. The input silicon waveguide 638 is coupled to a primary III-V semiconductor-based waveguide 518 at the input end of the primary III-V semiconductor-based waveguide 518. The optical path passes into the input side of the primary III-V semiconductor-based waveguide 518. The input optical path is then split into two modulation optical paths at and by a III-V semiconductor-based beam splitter 523. Each of the two modulation optical paths passes through a respective secondary III-V semiconductor-based waveguide 511a, 511b, and the active phase modulating portion of the secondary III-V semiconductor-based waveguide 511a, 511b. At a III-V semiconductor-based beam combiner 529, the modulation optical paths are combined and pass through the output side of the primary III-V semiconductor-based waveguide 518. The primary III-V semiconductor-based waveguide 518 is coupled at its output end to an output silicon waveguide 647. The output optical path passes through the output silicon waveguide 647. The process is mirrored in each of the four binary phase keying modulators 1535, which in combination form the two quadrature phase shift keying modulators 1534 (which in turn form the overall dual polarization quadrature phase shift keying modulator 1501).

Figure 16:
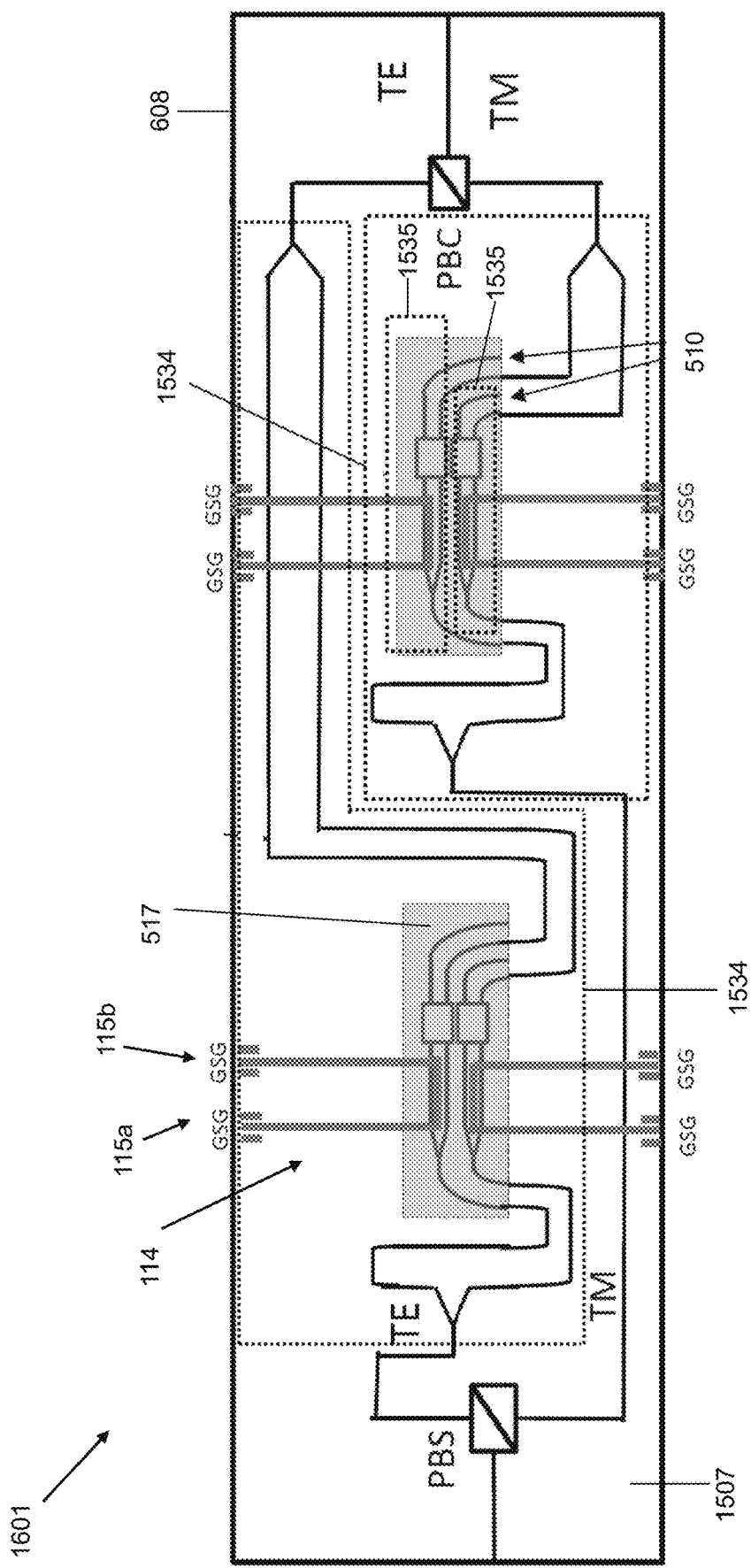
FIG. 16 shows a dual polarization phase shift keying modulator according to an embodiment of the present invention.

FIG. 16 shows a dual polarization quadrature phase shift keying modulator 1601. This modulator 1601 uses the same device coupons 517 as the modulator 1501 shown in FIG. 15. Like features are indicated by like reference numerals. It differs from the example shown in FIG. 15 by the spatial arrangement of the binary phase shift keying modulators 1534 making up the respective dual polarization quadrature phase shift keying modulators. The device coupons 517 in the dual polarization quadrature phase shift keying modulators 1501, 1601 shown in FIGS. 15 and 16 are provided on the silicon-on-insulator platform 607 in different arrangements.

In FIGS. 6 to 16, the contacts in electrical contact with the active phase modulating regions are electrodes in coplanar waveguide electrode configurations, as described above with reference to FIG. 1.

Figure 17B:
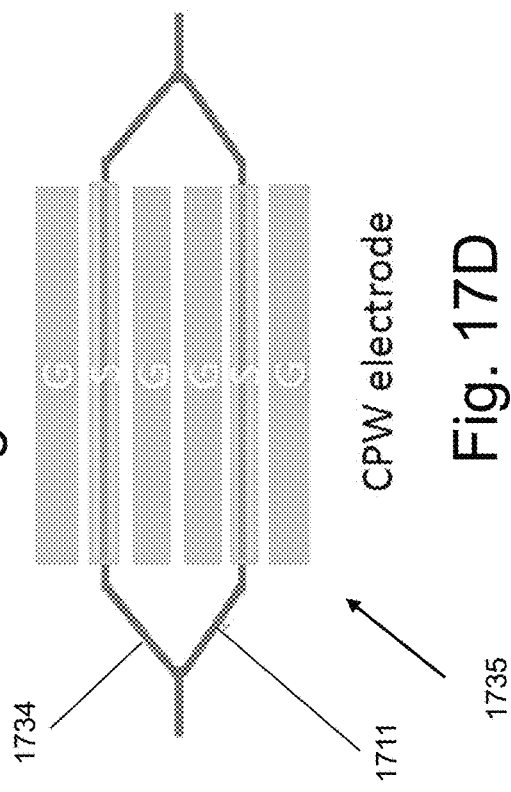
FIG. 17B shows an electrode configuration according to an embodiment of the present invention.
Figure 17A:
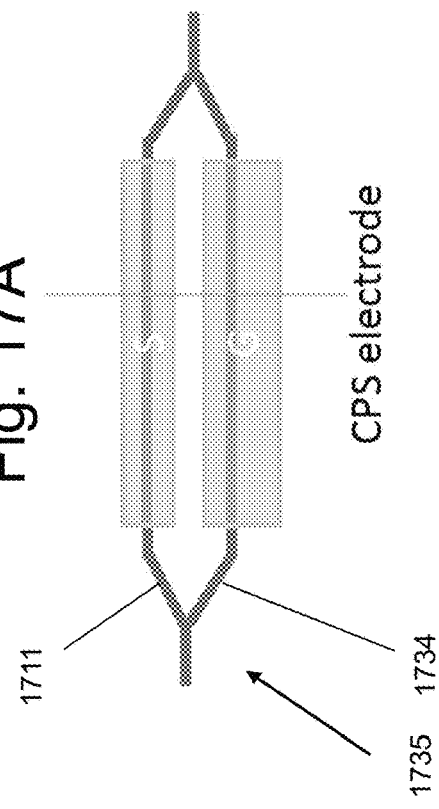
FIG. 17A shows an electrode configuration according to an embodiment of the present invention.
Figure 17D:
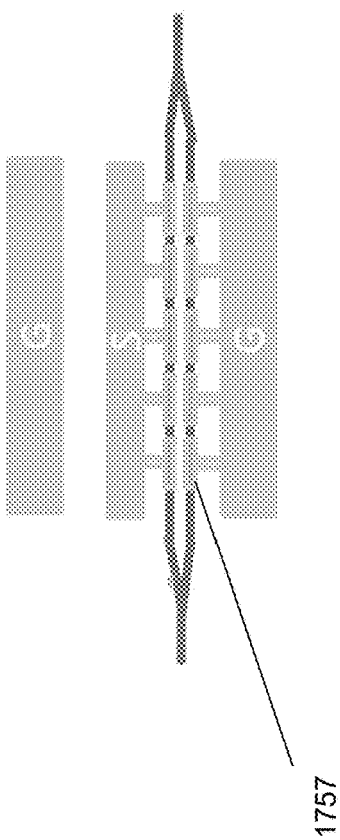
FIG. 17D shows an electrode configuration according to an embodiment of the present invention.
Figure 17C:
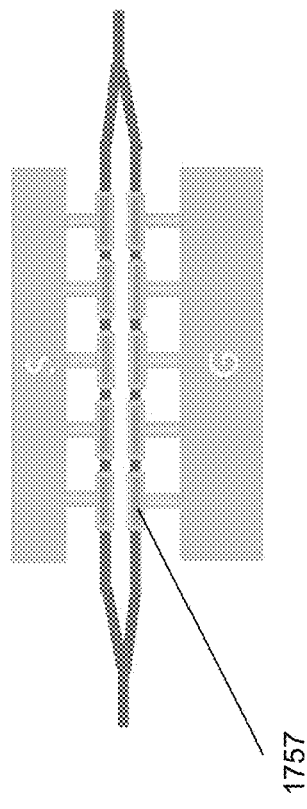
FIG. 17C shows an electrode configuration according to an embodiment of the present invention.

FIGS. 17A-17D shows alternative configurations of travelling wave electrodes in electrical contact with III-V semiconductor-based optical waveguides 1711 which can be implemented in the above modulators. FIG. 17A shows a coplanar strip configuration, consisting of a signal electrode S in electrical contact with one of the active phase modulating portions of a binary phase shift keying modulator component 1735 and a ground electrode G, in electrical contact with another of the active phase modulating portions of the binary phase shift keying component 1735. FIG. 17B shows a coplanar waveguide configuration, consisting of a signal electrode S and two ground electrodes G in electrical contact with each active phase modulating portion of a binary phase shift keying component 1735. FIG. 17C shows a coplanar strip configuration wherein the electrodes comprise T-segments 1757. FIG. 17D shows a coplanar waveguide configuration wherein the electrodes comprise T segments 1757.

Figure 18:
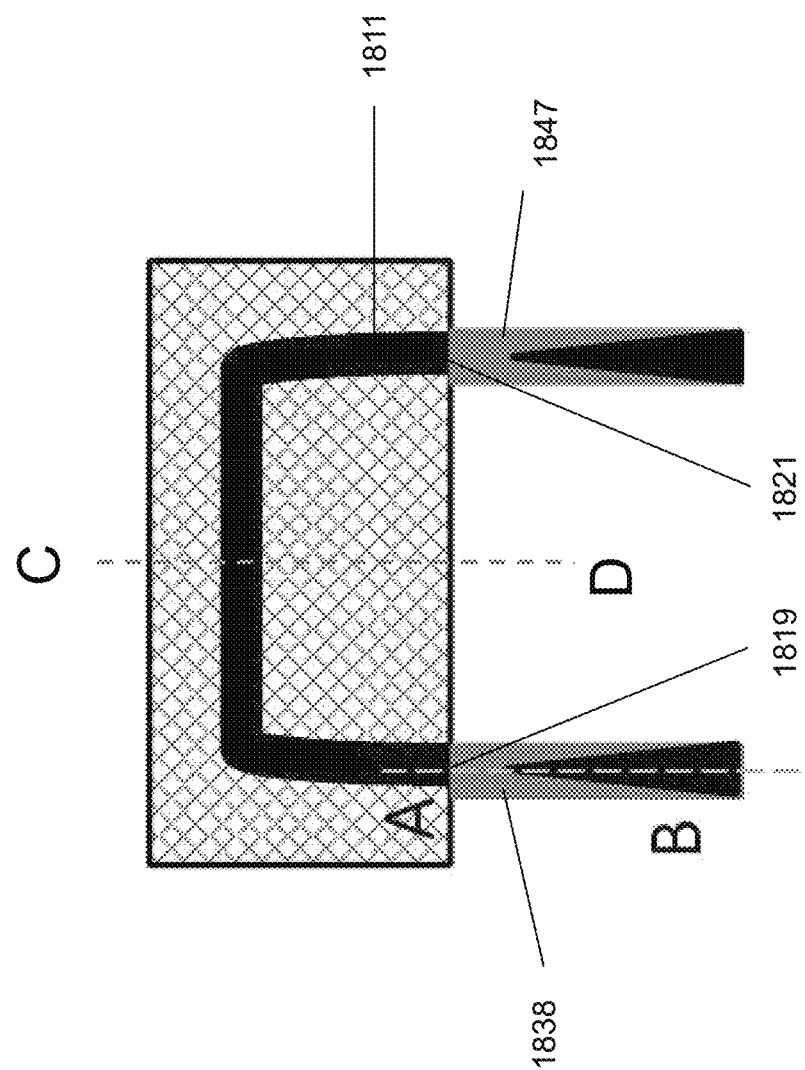
FIG. 18 shows a top view of a III-V semiconductor-based waveguide coupled to silicon waveguides according to an embodiment of the present invention.

FIG. 18 shows a top-view of a III-V semiconductor-based waveguide 1811 comprising a single optical path coupled at an input end 1819 to a first silicon-on-insulator SOI silicon waveguide 1838 and coupled at an output end 1821 to a second silicon waveguide 1847.

FIGS. 19A-22A show a cross-sectional view of FIG. 18 across line A-B for different silicon-on-insulator platforms 1907, 2007, 2107, 2207. FIGS. 19B-22B show a cross-sectional view of FIG. 18 across line C-D for different silicon-on-insulator platforms, corresponding to the platforms 1907, 2007, 2107, 2207 of FIGS. 19A-22A.

Figure 19A:
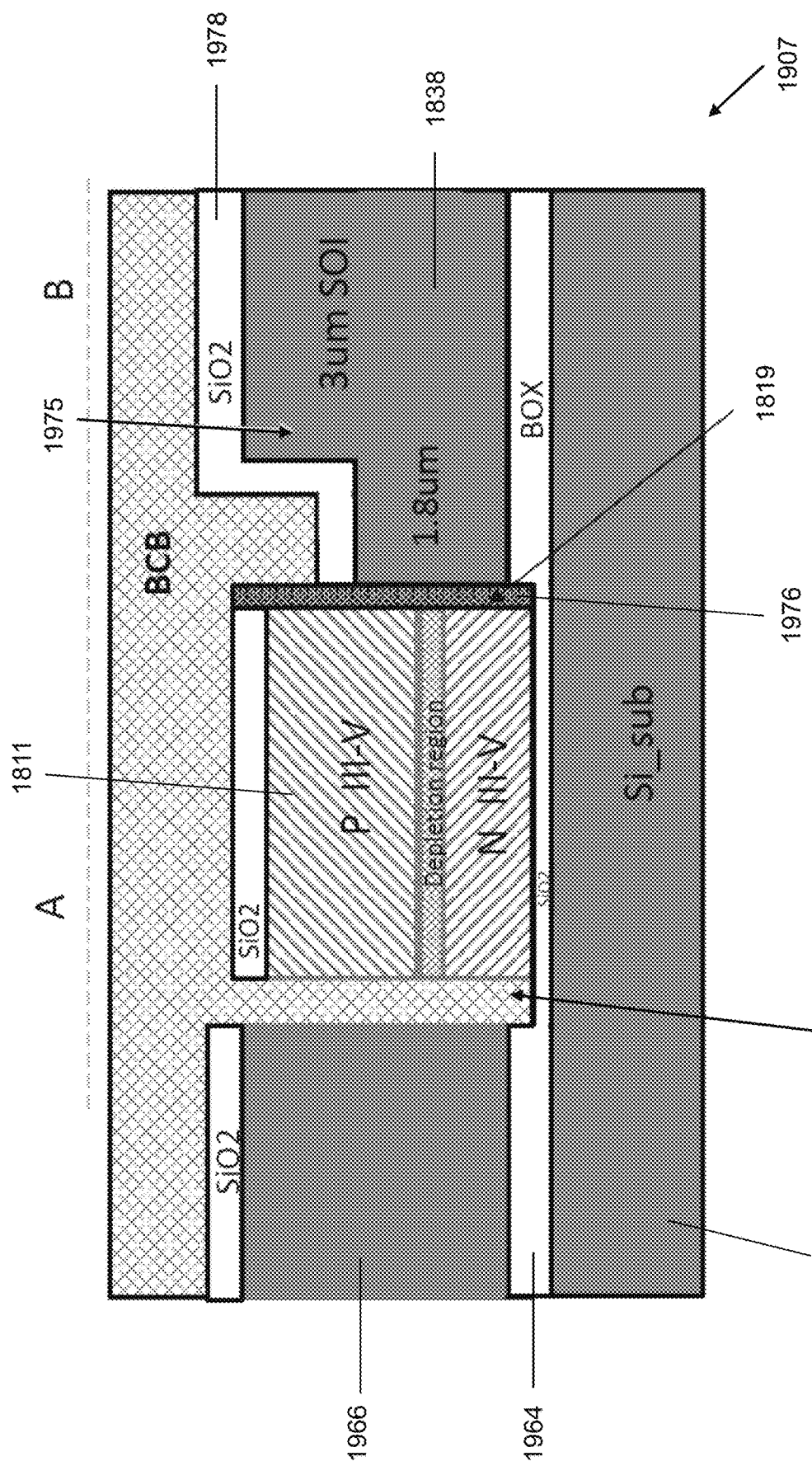
FIG. 19A is a section view of FIG. 18 along line A-B.

The silicon-on-insulator platform 1907 shown in FIG. 19A comprises a substrate layer 1962 a platform insulator layer 1964 and a device layer 1966. The platform insulator layer 1964 is a silicon dioxide buried oxide layer BOX. The substrate layer may be silicon.

A cavity 1909 of the silicon-on-insulator platform 1907 has been formed by etching layers of the platform away. The cavity 1909 extends entirely through the device layer 1966 and only partially through the platform insulator layer 1964 such that a portion of the platform insulator layer 1964 is on or defines the bottom of the silicon-on-insulator cavity 1909. The thickness of the platform insulator layer 1964 is chosen such that the optical mode coupling efficiency between the III-V semiconductor-based waveguide 1811 and the silicon waveguide 1838 is maximised.

The silicon-on-insulator silicon waveguide 1838 tapers in height from a first height to a second height as the silicon waveguide approaches the cavity 1909, the first height being larger than the second height. The resulting taper 1975 may function as a mode converter between an optical mode within the III-V semiconductor-based device 1811 and an optical mode in the silicon waveguide 1838. A first height may be around 3 microns and a second height may be around 1.8 microns. In this, and other, example(s), the III-V semiconductor-based device 1811 includes a depletion region. The depletion region may be a multiple quantum well structure or a separate confinement heterostructure.

An antireflective coating 1976 is provided at the silicon-on-insulator waveguide/III-V semiconductor-based waveguide facet 1819. An antireflective coating 1976 may be provided on a sidewall of the cavity 1909 which will face the III-V semiconductor-based waveguide 1811. The anti-reflective coating 1976 may be provided around one or more lateral sides of a device coupon. The anti-reflective coating 1976 acts to enhance the coupling from the III-V semiconductor-based waveguide 1811 to the silicon waveguide 1838. The anti-reflective coating 1976 can serve to reduce optical losses, protect the lateral sides of the device coupon during a transfer printing process, and enhance device long term reliability. The anti-reflective coating may be made of a single layer with a single material or multiple layers with multiple materials, for example, from III-V waveguide facet to SOI waveguide facet: 20 nm silicon oxide, 180 nm silicon nitride, 100 nm silicon oxide, 520 nm BCB and 180 nm silicon nitride.

The remaining space between the silicon platform 1907 and the device coupon is filled and covered with a dielectric such as benzocyclobutene BCB or a BCB resin to act as a device passivation layer. BCB has a relatively low dielectric constant, which can reduce parasitic capacitance and so provide a higher operating speed.

A cladding layer of silicon dioxide 1978 is formed over the III-V semiconductor-based device 1811 and the silicon-on-insulator platform 1907 so as to, for example, passivate the device.

Figure 19B:
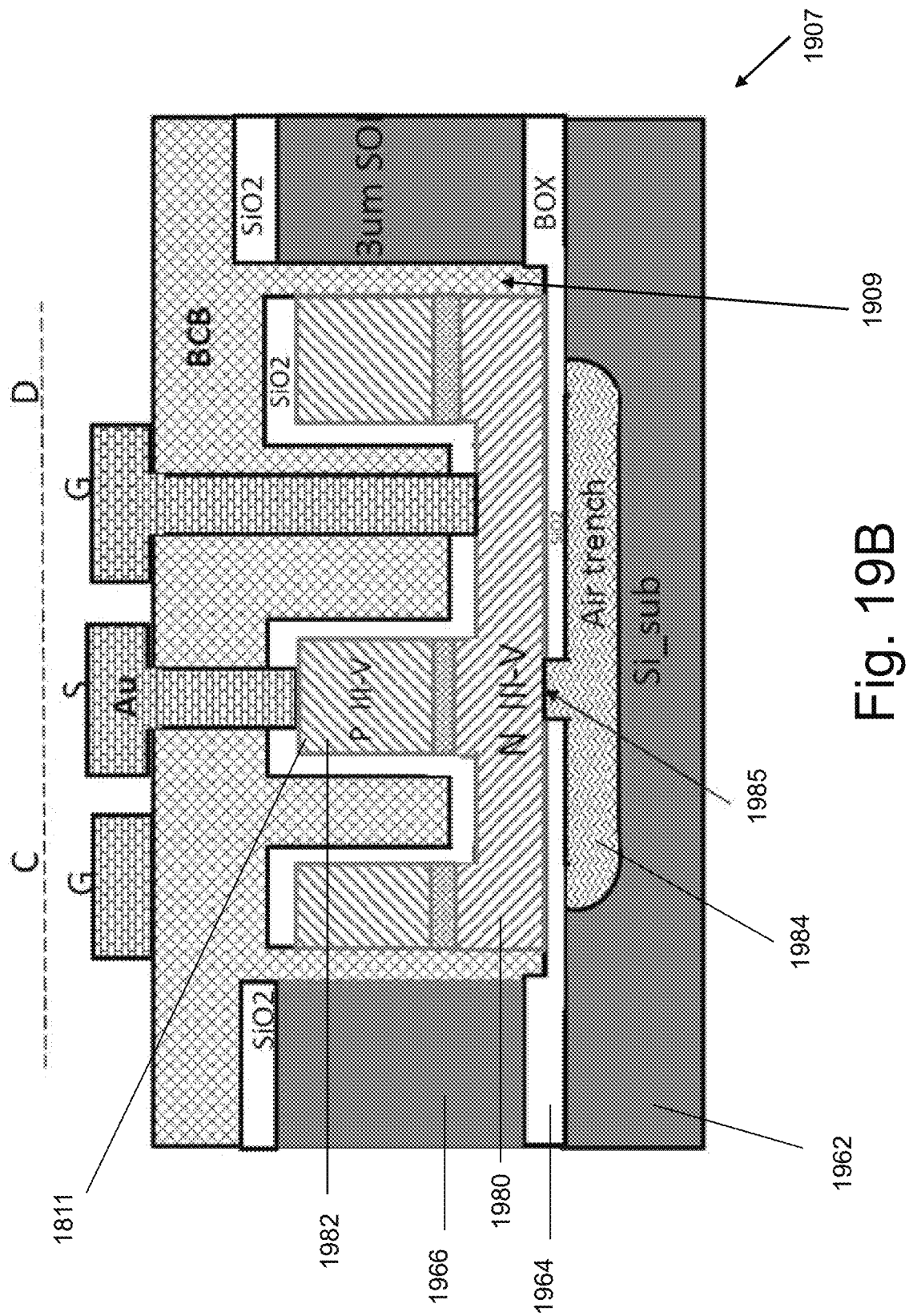
FIG. 19B is a section view of FIG. 18 along line C-D.

FIG. 19B shows the platform 1907 along a cross-sectional view of FIG. 18 across line C-D.

As shown in the figure, the III-V semiconductor-based waveguide 1811 is provided in the cavity 1909. The III-V semiconductor-based waveguide 1811 is provided on a device coupon which has been micro transfer printed into the cavity 1909. The III-V semiconductor-based waveguide 1811 includes a waveguide slab 1980 and a ridge or rib 1982 extending therefrom.

The III-V semiconductor-based waveguide 1811 includes two electro-optically active layers: an n-doped layer N III-V and a p-doped layer P III-V. The n-doped layer is connected to a ground electrode G, and the p-doped layer is connected to a signal electrode S. The order of the n-doped layer and the p-doped layer may be reversed. The electrode connections of the n-doped layer and the p-doped layer may be reversed. The electrical contacts GSG cover a portion of the silicon-on-insulator platform 1907 and a portion of the III-V semiconductor-based device 1811.

There is an insulation trench 1984 lying in the substrate layer 1962 at the bottom of the silicon-on-insulator cavity 1909. The insulation trench 1984 is deposited such that it is beneath a region of the III-V semiconductor-based device 1811 which is in electrical contact with the one or more contacts GSG. The insulating material of the insulation trench 1984 in this example is air. A portion of the air trench 1984 is located under the insulator layer 1964. A portion of the insulator layer 1964 is entirely etched away 1985 to allow etching of the air trench 1984.

Advantageously the platform insulation layer 1964 provides a base to hold the coupon so that the insulation trench 1984 underneath can be smaller or bigger than the cavity in which the coupon sits, which provides extra flexibility in device design.

Figure 20A:
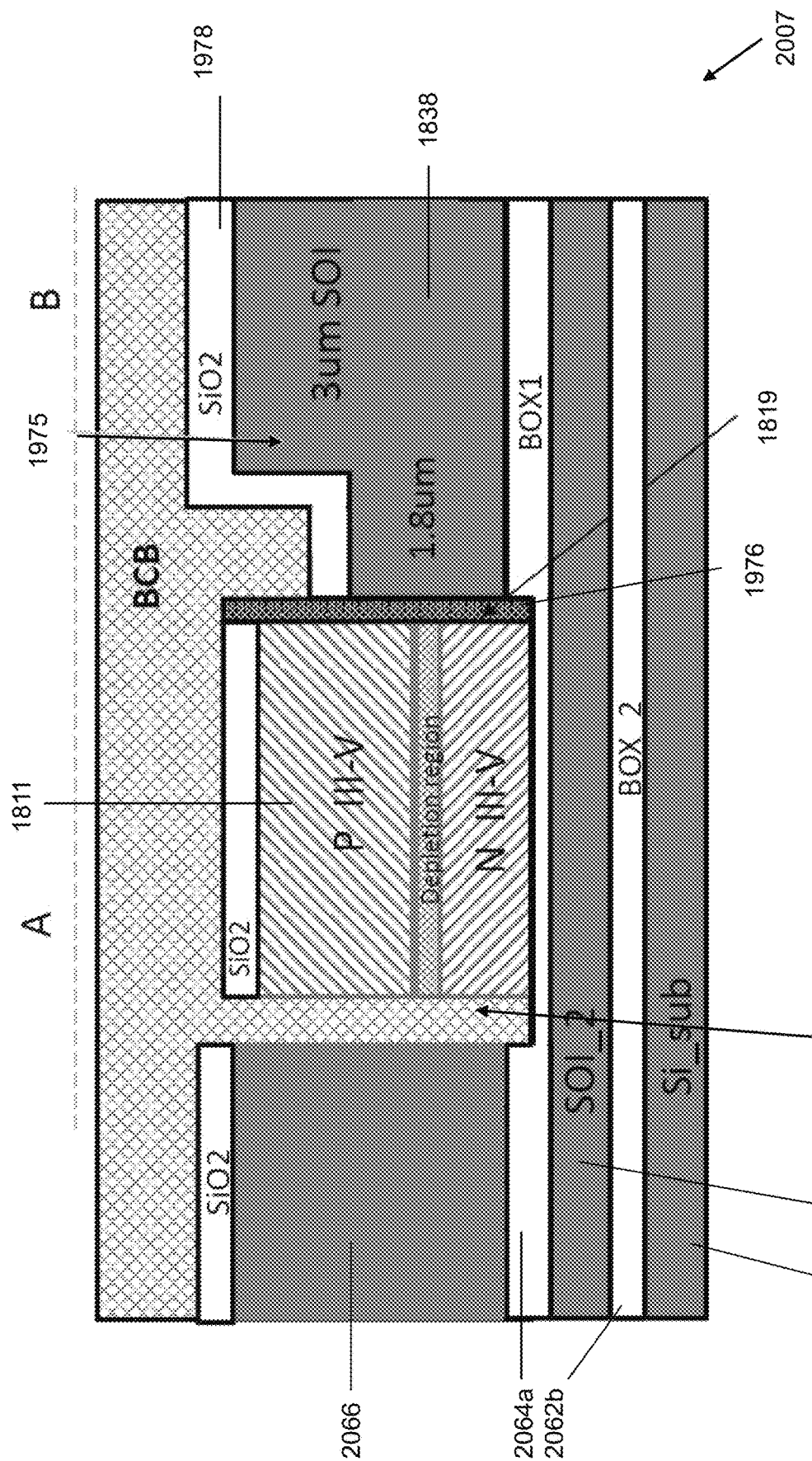
FIG. 20A is a variant section view of FIG. 18 along line A-B.
Figure 20B:
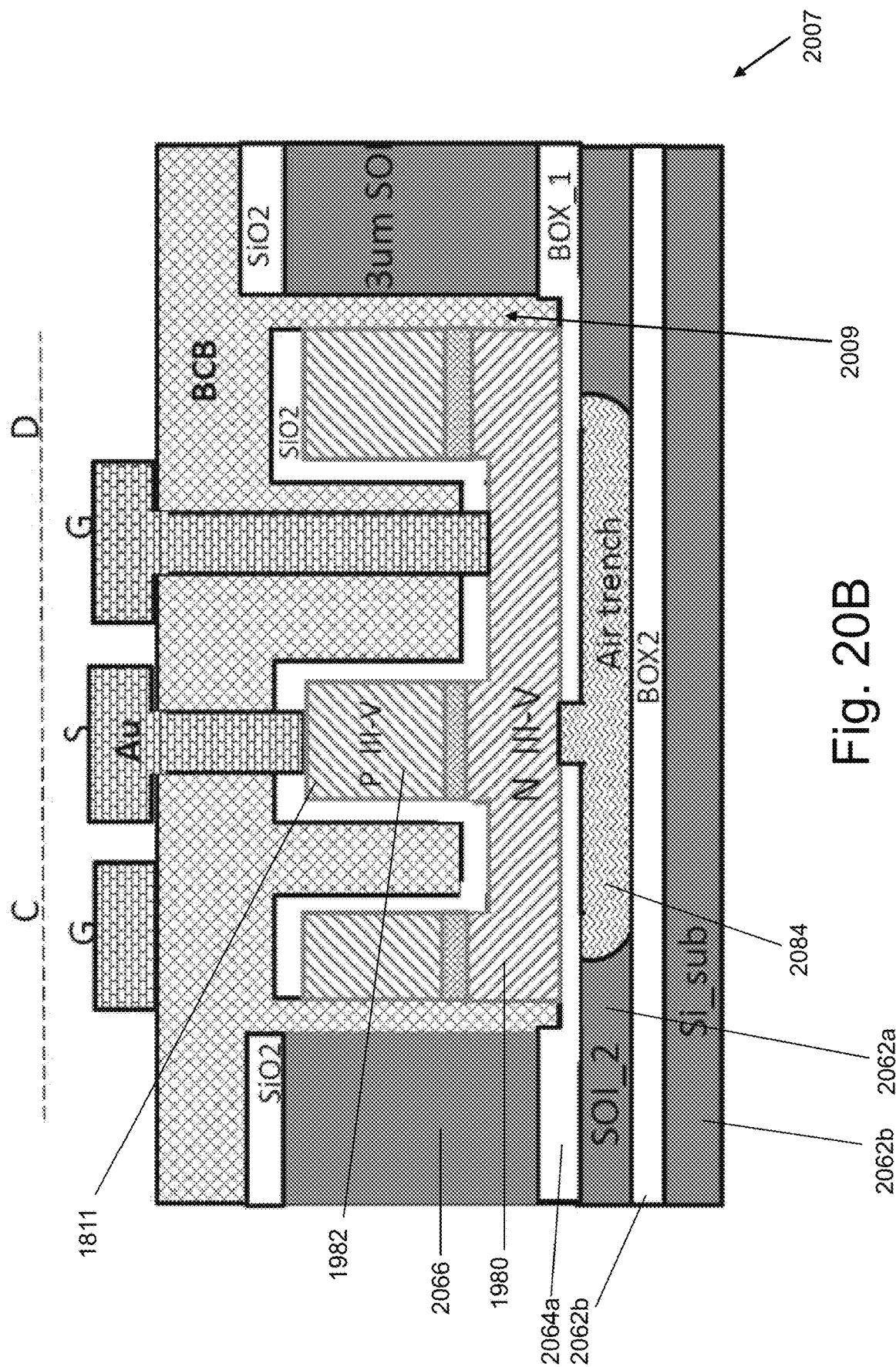
FIG. 20B is a variant section view of FIG. 18 along line C-D.

The silicon-on-insulator platform 2007 of FIGS. 20A and 20B shares several features of the platform 1907 shown in FIG. 19. Like features are indicated by like reference numerals.

The silicon-on-insulator platform 2007 in FIG. 20A comprises two substrate layers 2062a, 2062b, two platform insulator layers 2064a, 2064b and a device layer 2066. The first platform insulator layer 2064a is positioned between the device layer 2066 and the first substrate layer 2062a, and the second insulator layer 2062b is positioned between the first substrate layer 2062a and the second substrate layer 2062b so as to form a double silicon on insulator platform 2007. The platform insulator layers 2064a, 2064b are silicon dioxide buried oxide layers BOX. The substrate layer may be silicon.

A cavity 2009 of the silicon-on-insulator platform 2007 has been formed by etching layers of the platform away. The cavity 2009 extends entirely through the device layer 2066 and only partially through the first platform insulator layer 2064a such that a portion of the first platform insulator layer 2064a is on or defines the bottom of the silicon-on-insulator cavity 2009. The thickness of the first platform insulator layer 2064a and the depth of the silicon-on-insulator cavity 2009 are chosen such that the optical mode coupling efficiency between the III-V semiconductor-based waveguide 1811 and the silicon waveguide 1838 is maximised.

Turning to FIG. 20B, there is an insulation trench 2084 lying in the first substrate layer 2062a at the bottom of the silicon-on-insulator cavity 2009. The insulation trench 2084 is deposited such that it is beneath a region of the III-V semiconductor-based device 1811 which is in electrical contact with the one or more contacts GSG. The insulating material of the insulation trench 2084 is air. A portion of the air trench 2084 is located under the first insulator layer 2064a. A portion of the first insulator layer 2064a is entirely etched away to allow etching of the air trench 2084. By providing a second platform insulator layer 2064b, the depth of the insulation trench 2084 can be easily controlled as the insulator layer functions as an etch stop.

The electrical contacts GSG cover a portion of the silicon-on-insulator platform 2007 and a portion of the III-V semiconductor-based device 1811.

Figure 21A:
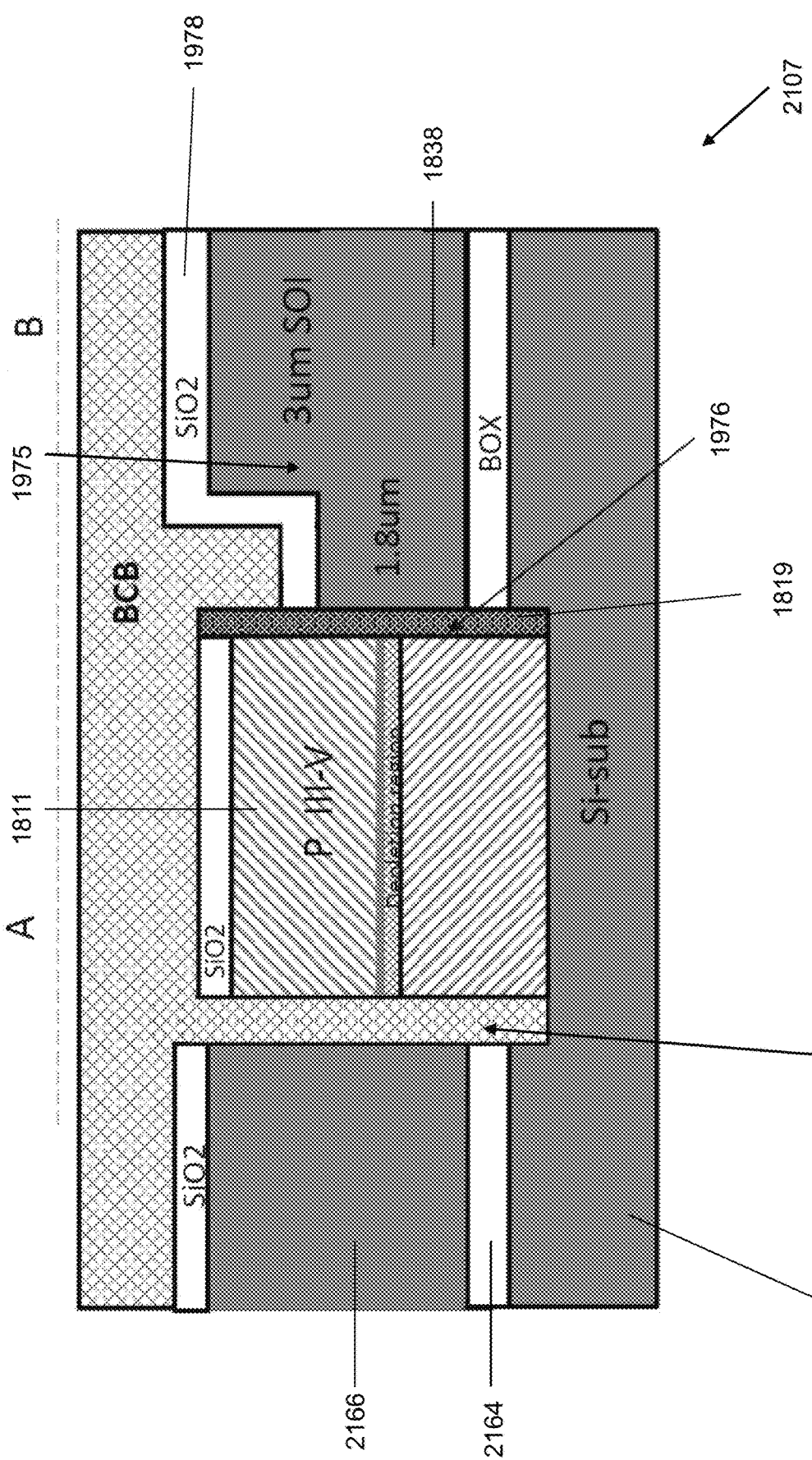
FIG. 21A is a variant section view of FIG. 18 along line A-B.
Figure 21B:
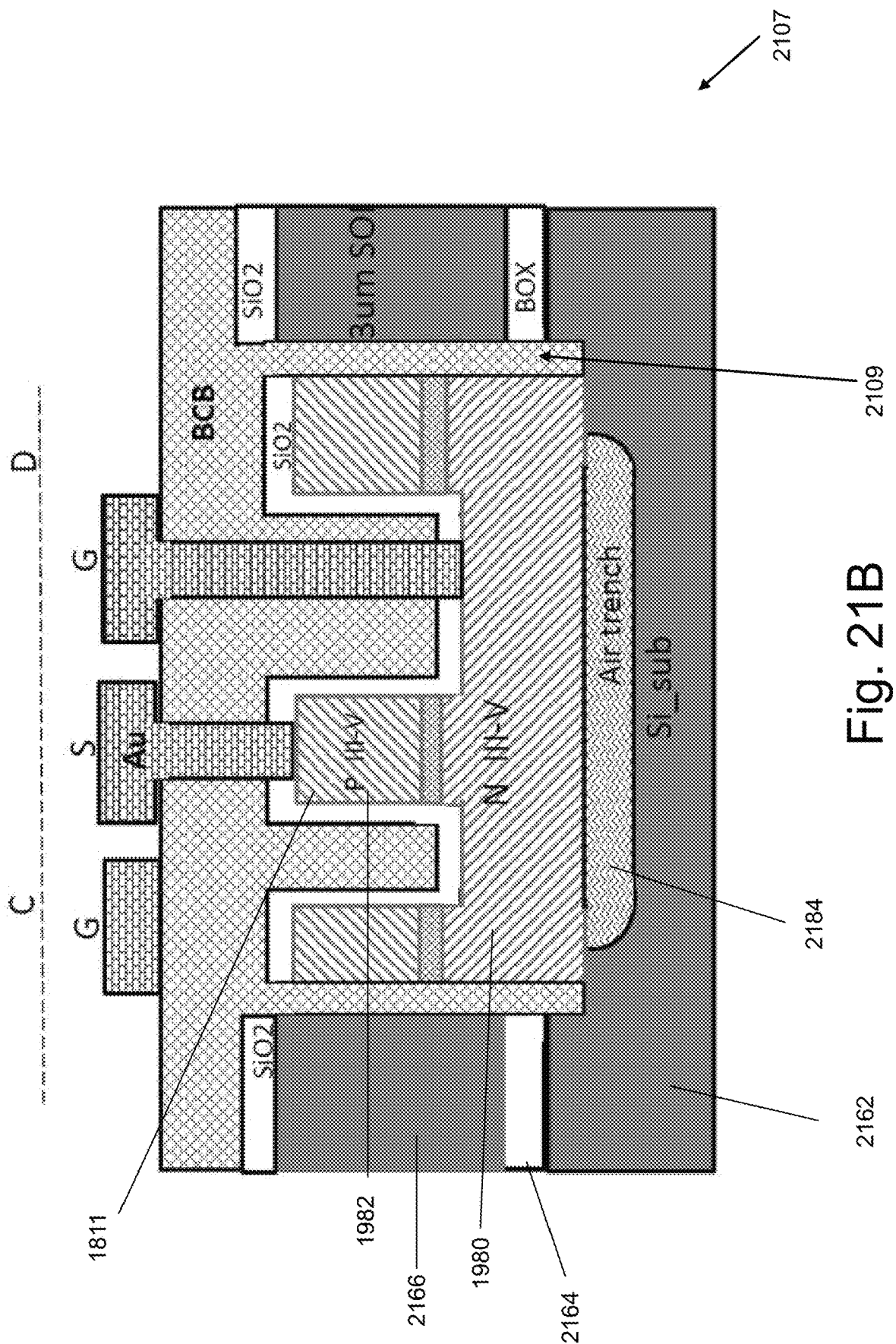
FIG. 21B is a variant section view of FIG. 18 along line C-D.

The silicon-on-insulator platform 2107 of FIGS. 21A and 21B shares several features of the platforms 1907, 2007 shown in FIGS. 19A, 19B and 20A, 20B. Like features are indicated by like reference numerals.

The silicon-on-insulator platform 2107 in FIG. 21A comprises a substrate layer 2162 a platform insulator layer 2164 and a device layer 2166. The platform insulator layer 2164 is a silicon dioxide buried oxide layer BOX. The substrate layer may be silicon.

A cavity 2109 of the silicon-on-insulator platform 2107 has been formed by etching layers of the platform 2109 away. The cavity 2109 extends entirely through the device layer 2166 and entirely through the platform insulator layer 2164. The depth of the silicon-on-insulator cavity 2109 is chosen such that the optical mode coupling efficiency between the III-V semiconductor-based waveguide 1811 and the silicon waveguide 1838 is maximised.

In the example shown in FIG. 21A, the III-V semiconductor-based device 1811 directly contacts the substrate layer 2162. Where this is formed from silicon, the silicon has a relatively high thermal conductivity (e.g. higher than the platform insulator layer 2164) and so there is a smaller thermal resistance. Moreover, the depth of the cavity can be more flexibly determined, such that the III-V semiconductor-based device 1811, and specifically an n-doped layer thereof, can be made thicker if needed which can reduce the series resistance.

Turning to FIG. 21B, there is an insulation trench 2184 lying in the substrate layer 2162 at the bottom of the silicon-on-insulator cavity 2109. The insulation trench 2184 is deposited such that it is beneath a region of the III-V semiconductor-based device 1811 which is in electrical contact with the one or more contacts GSG. The insulating material of the insulation trench 2184 is air.

The contacts GSG cover a portion of the silicon-on-insulator platform 2107 and a portion of the III-V semiconductor-based device 1811.

Figure 22A:
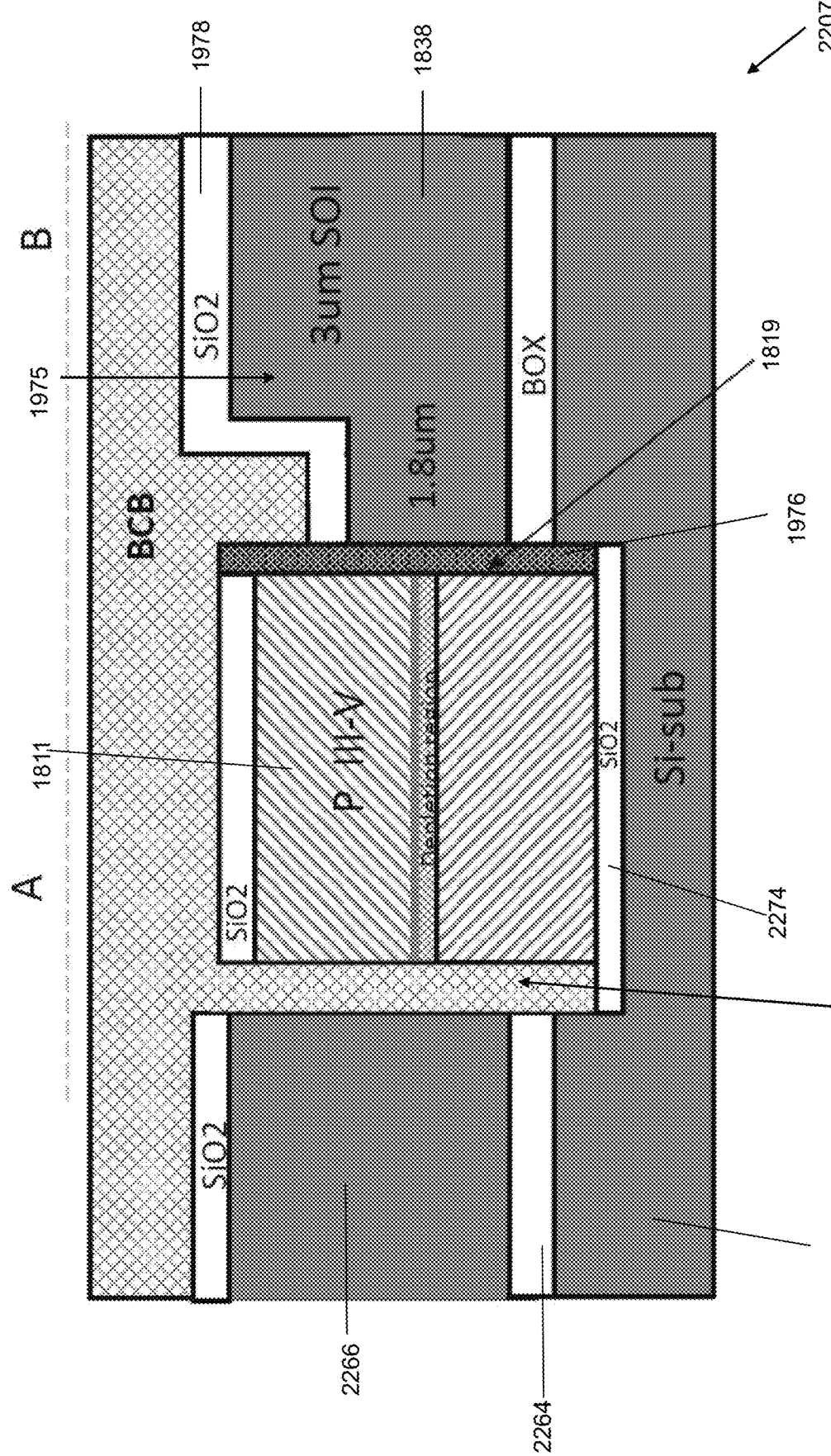
FIG. 22A is a variant section view of FIG. 18 along line A-B.
Figure 22B:
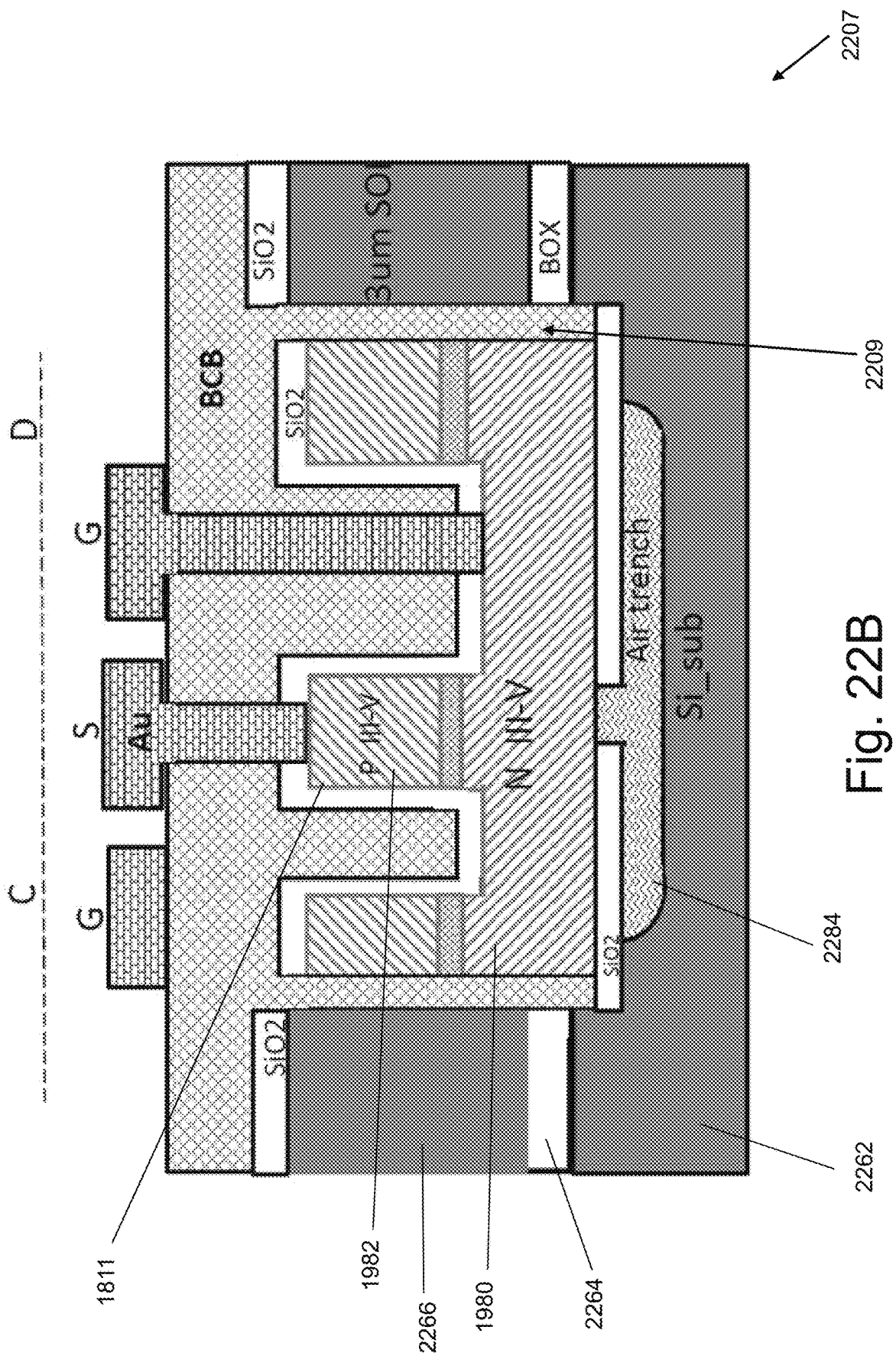
FIG. 22B is a variant section view of FIG. 18 along line C-D.

The silicon-on-insulator platform 2207 of FIGS. 22A and 22B shares several features of the platforms 1907, 2007, 2107 shown in FIGS. 19A, 19B, 20A, 20B and 21A, 21B. Like features are indicated by like reference numerals.

The silicon-on-insulator platform 2207 in FIG. 22A comprises a substrate layer 2262 a platform insulator layer 2264 and a device layer 2266. The platform insulator layer 2264 is a silicon dioxide buried oxide layer BOX. The substrate layer may be silicon.

A cavity 2209 of the silicon-on-insulator platform 2207 has been formed by etching layers of the platform 2209 away. The cavity 2209 extends entirely through the device layer 2266 and entirely through the platform insulator layer 2264, and a cavity insulator layer 2274 is provided on the base of the cavity 2209. The thickness of the cavity insulator layer 2274 and the depth of the silicon-on-insulator cavity 2209 are chosen such that the optical mode coupling efficiency between the III-V semiconductor-based waveguide 1811 and the silicon waveguide 1838 is maximised. As before, the cavity depth can be more flexibly controlled so as to make the III-V semiconductor-based device 1811, and specifically an n-doped layer thereof, thicker if needed to as to reduce the sheet resistance and make the device series resistance smaller.

Turning to FIG. 22B, there is an insulation trench 2284 lying in the substrate layer 2262 at the bottom of the silicon-on-insulator cavity 2209. The insulation trench 2284 is deposited such that it is beneath a region of the III-V semiconductor-based device 1811 which is in electrical contact with the one or more contacts GSG. The insulating material of the insulation trench 2284 is air. A portion of the air trench 2284 is located under the cavity insulator layer 2274. A portion of the cavity insulator layer 2274 is entirely etched away to allow etching of the air trench 2284.

The contacts GSG cover a portion of the silicon-on-insulator platform 2207 and a portion of the III-V semiconductor-based device 1811.

In all of the silicon-on-insulator platforms 1907, 2007, 2107, 2207 discussed above, an adhesive layer may be formed in the cavity of the silicon-on-insulator platform, forming the bonding surface of the cavity. The adhesive layer may be a spun coated dielectric, for example benzocyclobutene or a BCB resin. The adhesive layer, if provided, may have a thickness of 30-100 nm.

The features disclosed in the description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

LIST OF FEATURES

101 Phase shift keying modulator
103 Silicon waveguide
105 Silicon waveguide
107 Silicon-on-insulator platform
108 Silicon chip edge
109 Cavity
111 III-V semiconductor-based waveguide
113 Active phase modulating portion
114 Coplanar waveguide electrode configuration
115a, 115b Radio frequency launch pads
116 Travelling wave electrode
210 III-V semiconductor-based device (waveguide)
211 III-V semiconductor based waveguide
213 Active phase modulating portion
217 Device coupon
219 Input facet
221 Output facet
310a, 310b III-V semiconductor-based device (waveguide)
311a, 311b III-V semiconductor-based waveguide
313a, 313b Active phase modulating portion
317 Device coupon
319a, 319b Input facet
321a, 321b Output facet
410 III-V semiconductor-based device (MZM)
411a, 411b III-V semiconductor-based waveguide
413a, 413b Active phase modulating portion
417 Device coupon
418 Primary III-V semiconductor-based waveguide
419 Input facet
421 Output facet
423 Beam splitter
429 Beam combiner
433 Output facet
510 III-V semiconductor-based device (MZM)
511a, 511b III-V semiconductor-based waveguide
513a, 513b Active phase modulating portion 517 Device coupon
518 Primary III-V semiconductor-based waveguide
519 Input facet
521 Output facet
523 Beam splitter
529 Beam combiner
533 Output facet
601 Dual polarization quadrature phase shift keying modulator
607 Silicon-on-insulator platform
634 Quadrature phase shift keying modulator component
635 Binary phase shift keying modulator component
636 Parent beam splitter
637 Parent beam combiner
638 Primary input silicon waveguide
639 Beam splitter
641a, 641b Secondary input silicon waveguide
643a, 643b Secondary output silicon waveguide
645 Beam combiner
647 Primary output silicon waveguide
701 Dual polarization quadrature phase shift keying modulator
801 Dual polarization quadrature phase shift keying modulator
901 Dual polarization quadrature phase shift keying modulator
934 Quadrature phase shift keying modulator component
935 Binary phase shift keying modulator component
1001 Dual polarization quadrature phase shift keying modulator
1101 Dual polarization quadrature phase shift keying modulator
1201 Dual polarization quadrature phase shift keying modulator
1301 Dual polarization quadrature phase shift keying modulator
1334 Quadrature phase shift keying modulator component
1335 Binary phase shift keying modulator component
1401 Dual polarization quadrature phase shift keying modulator
1501 Dual polarization quadrature phase shift keying modulator
1534 Quadrature phase shift keying modulator component
1535 Binary phase shift keying modulator component
1601 Dual polarization quadrature phase shift keying modulator
1711 III-V semiconductor-based waveguide
1735 Binary phase shift keying modulator component
1757 T-segment of electrode
1811 III-V semiconductor-based waveguide
1819 Input end of III-V semiconductor-based waveguide
1821 Output end of III-V semiconductor-based waveguide
1838 Silicon waveguide
1847 Silicon waveguide
1907 Silicon-on-insulator platform
1909 Cavity
1962 Substrate layer
1964 Platform insulator layer
1966 Device layer
1975 Taper
1976 Antireflective coating
1978 Silicon dioxide cladding
1980 Waveguide slab
1982 Waveguide ridge
1984 Insulation trench
1985 Entirely etched region
2007 Silicon-on-insulator platform
2009 Cavity
2062a, 2062b Substrate layer
2064a, 64b Platform insulator layer
2066 Device layer
2084 Insulation trench
2107 Silicon-on-insulator platform
2109 Cavity
2162 Substrate layer
2164 Platform insulator layer
2166 Device layer
2184 Insulation trench
2207 Silicon-on-insulator platform
2209 Cavity
2262 Substrate layer
2264 Platform insulator layer
2266 Device layer
2274 Cavity insulator layer
2284 Insulation trench
G Ground electrode
PBC Polarization beam combiner
PBS Polarization beam splitter
TE Transverse electric polarization state
TM Transverse magnetic polarization state
S Signal electrode

The invention claimed is:

1. A phase shift keying modulator, comprising:
a plurality of silicon waveguides provided in a device layer of a silicon-on-insulator platform, the silicon-on-insulator platform including one or more cavities;
one or more III-V semiconductor-based devices located within the one or more cavities of the silicon-on-insulator platform, each III-V semiconductor-based device including a III-V semiconductor-based waveguide which is coupled at an input end to one of the plurality of silicon waveguides and coupled at an output end to another of the plurality of silicon waveguides, each III-V semiconductor-based waveguide comprising an active phase modulating portion; and
one or more contacts in electrical contact with each active phase modulating portion, such that the phase shift keying modulator is operable to modulate the phase of an optical wave passing through each active phase modulating portion,
wherein the silicon-on-insulator platform comprises a first substrate layer and a first insulator layer, the first insulator layer being between the device layer and the first substrate layer, and
wherein at least one of the one or more cavities extends entirely through the device layer and only partially through the first insulator layer.

2. The phase shift keying modulator of claim 1, wherein the one or more III-V semiconductor-based devices are provided on one or more device coupons, which are bonded to a bed of the respective cavity.

3. The phase shift keying modulator of claim 2, wherein each device coupon is transfer printed into a respective cavity of the silicon-on-insulator platform.

4. The phase shift keying modulator of claim 2, wherein the one or more device coupons each comprise only one III-V semiconductor-based waveguide, the III-V semiconductor-based waveguide comprising a single optical path.

5. The phase shift keying modulator of claim 2, wherein the one or more device coupons each comprise only one III-V semiconductor-based MZM.

6. The phase shift keying modulator of claim 2, wherein the one or more device coupons each comprise two III-V semiconductor-based MZMs.

7. The phase shift keying modulator of claim 1, wherein the phase shift keying modulator includes a binary phase shift keying modulator component, the binary phase shift keying modulator component comprising:
a beam splitter, the beam splitter splitting an input optical path into two modulation optical paths; and,
a beam combiner, the beam combiner combining the two modulation optical paths into an output optical path,
wherein the input optical path passes through an input silicon waveguide, each of the two modulation optical paths pass through respective active phase modulating portions, and the output optical path passes through an output silicon waveguide.

8. The phase shift keying modulator of claim 7, wherein the phase shift keying modulator includes a quadrature phase shift keying modulator component, the quadrature phase shift keying modulator component comprising:
two binary phase shift keying modulator components;
a parent beam splitter, the parent beam splitter splitting an input optical path into two binary modulator optical paths; and,
a parent beam combiner, the parent beam combiner combining the two binary modulator optical paths into an output optical path,
wherein the input optical path passes through an input silicon waveguide, each of the binary modulator optical paths pass through a respective binary phase shift keying modulator component, and the output optical path passes through an output silicon waveguide.

9. The phase shift keying modulator of claim 8, wherein the phase shift keying modulator includes a dual polarization quadrature phase shift keying modulator component, the dual polarization quadrature phase shift keying modulator component comprising:
two quadrature phase shift keying modulator components;
a polarization beam splitter, the polarization beam splitter splitting an input optical path into two quadrature modulator optical paths; and,
a polarization beam combiner, the polarization beam combiner combining the two quadrature modulator optical paths into an output optical path,
wherein the input optical path passes through an input silicon waveguide, each of the two quadrature modulator optical paths have respectively different polarization states and pass through a respective quadrature phase shift keying modulator component, and the output optical path passes through an output silicon waveguide.

10. The phase shift keying modulator of claim 1, wherein there is an insulation trench between at least one of the one or more III-V semiconductor-based devices and a substrate layer of the silicon-on-insulator platform.

11. The phase shift keying modulator of claim 10, wherein the insulation trench is formed by or filled with air.

12. The phase shift keying modulator of claim 1, wherein the silicon-on-insulator platform further comprises a second insulator layer and a second substrate layer, the second insulator layer being between the first substrate layer and the second substrate layer so as to form a double silicon on insulator platform.

13. The phase shift keying modulator of claim 1, wherein the length of each of the active phase modulating portions is at least 300 µm and no more than 3000 µm.

14. A method of manufacturing the phase shift keying modulator of claim 1, the method comprising:
providing the silicon-on-insulator platform;
providing one or more device coupons, the device coupons comprising the one or more III-V semiconductor-based devices;
depositing each device coupon into a respective cavity of the silicon-on-insulator platform; and
electrically connecting the one or more contacts with each active phase modulating portion.

15. A phase shift keying modulator, comprising:
a plurality of silicon waveguides provided in a device layer of a silicon-on-insulator platform, the silicon-on-insulator platform including one or more cavities;
one or more III-V semiconductor-based devices located within the one or more cavities of the silicon-on-insulator platform, each III-V semiconductor-based device including a III-V semiconductor-based waveguide which is coupled at an input end to one of the plurality of silicon waveguides and coupled at an output end to another of the plurality of silicon waveguides, each III-V semiconductor-based waveguide comprising an active phase modulating portion; and
one or more contacts in electrical contact with each active phase modulating portion, such that the phase shift keying modulator is operable to modulate the phase of an optical wave passing through each active phase modulating portion,
wherein the phase shift keying modulator includes a binary phase shift keying modulator component, the binary phase shift keying modulator component comprising:
a beam splitter, the beam splitter splitting an input optical path into two modulation optical paths; and
a beam combiner, the beam combiner combining the two modulation optical paths into an output optical path,
wherein the input optical path passes through an input silicon waveguide, each of the two modulation optical paths pass through respective active phase modulating portions, and the output optical path passes through an output silicon waveguide, and
wherein the beam combiner is a 2×2 beam combiner and wherein one of the two output waveguides of the beam combiner is connected to a monitor for monitoring a DC bias.

16. The phase shift keying modulator of claim 15, wherein:
the silicon-on-insulator platform comprises a substrate layer and an insulator layer, the insulator layer being between the device layer and the substrate layer, and
at least one of the one or more cavities extends entirely through the device layer and only partially through the insulator layer.

17. A phase shift keying modulator, comprising:
a plurality of silicon waveguides provided in a device layer of a silicon-on-insulator platform, the silicon-on-insulator platform including one or more cavities;
one or more III-V semiconductor-based devices located within the one or more cavities of the silicon-on-insulator platform, each III-V semiconductor-based device including a III-V semiconductor-based waveguide which is coupled at an input end to one of the plurality of silicon waveguides and coupled at an output end to another of the plurality of silicon waveguides, each III-V semiconductor-based waveguide comprising an active phase modulating portion; and
one or more contacts in electrical contact with each active phase modulating portion, such that the phase shift keying modulator is operable to modulate the phase of an optical wave passing through each active phase modulating portion, wherein the one or more III-V semiconductor-based devices are provided on one or more device coupons, which are bonded to a bed of the respective cavity, and wherein the one or more device coupons each comprise two III-V semiconductor-based waveguides, each III-V semiconductor-based waveguide comprising a single optical path.

* * * * *